(12) United States Patent  (10) Patent No.: US 12,345,145 B2
Sun et al.  (45) Date of Patent: *Jul. 1, 2025

(54) METHOD TO CONTROL HYDRAULIC FRACTURING SPREAD WITH ELECTRIC PUMPS

(71) Applicant: Halliburton Energy Services, Inc., Houston, TX (US)

(72) Inventors: Zhijie Sun, Houston, TX (US); Yang Yu, Singapore (SG); Tirumani Swaminathan, Houston, TX (US); Ian Mitchell, Houston, TX (US); Sergei Parsegov, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 392 days.

This patent is subject to a terminal disclaimer.

(21) Appl. No.: 17/864,747

(22) Filed: Jul. 14, 2022

(65) Prior Publication Data

US 2024/0026763 A1  Jan. 25, 2024

(51) Int. Cl.
*E21B 43/26* (2006.01)
*G05B 13/04* (2006.01)
*G05D 7/00* (2006.01)

(52) U.S. Cl.
CPC ........ *E21B 43/2607* (2020.05); *G05B 13/042* (2013.01); *G05D 7/00* (2013.01)

(58) Field of Classification Search
CPC ...... E21B 43/2607; G05B 13/042; G05D 7/00
USPC ...................................................... 700/275
See application file for complete search history.

(56) References Cited

U.S. PATENT DOCUMENTS

| | | | |
|---|---|---|---|
| 8,789,596 B2 | 7/2014 | Curtis et al. | |
| 8,834,012 B2 | 9/2014 | Case et al. | |
| 2018/0189702 A1 | 7/2018 | Hunter et al. | |
| 2018/0298731 A1 | 10/2018 | Bishop | |
| 2018/0363640 A1* | 12/2018 | Kajita | G05B 19/042 |
| 2019/0245348 A1 | 8/2019 | Hinderliter et al. | |
| 2019/0316447 A1* | 10/2019 | Oehring | B60W 10/105 |
| 2020/0263528 A1* | 8/2020 | Fischer | H02B 5/00 |
| 2021/0040830 A1 | 2/2021 | Mu et al. | |
| 2021/0396115 A1* | 12/2021 | Yeung | E21B 43/267 |
| 2022/0003229 A1* | 1/2022 | Mu | F04B 17/06 |

(Continued)

OTHER PUBLICATIONS

Filing Receipt, Specification and Drawings for U.S. Appl. No. 17/864,750, filed Jul. 14, 2022, entitled "Method to Optimize Hydraulic Fracturing Spread with Electric Pumps," 71 pages.

(Continued)

*Primary Examiner* — Md Azad
(74) *Attorney, Agent, or Firm* — Conley Rose, P.C.; Rodney B. Carroll

(57) ABSTRACT

A method of controlling a pumping stage of a fracturing fleet at a wellsite with a set of diesel pumps and at least one electric pump to smooth the flowrate transition to an operational setpoint with a higher flowrate. An optimization process communicatively connected to the plurality of pumping units can iterate an interim setpoint with a transfer function model to each pumping unit. The transfer function model can generate a smooth flowrate transition by decreasing the flowrate of at least one pump unit while increasing the flowrate to the remaining pump units.

20 Claims, 7 Drawing Sheets

(56) References Cited

U.S. PATENT DOCUMENTS

2023/0175375 A1* 6/2023 Yeung ................ E21B 43/2607
166/308.1

OTHER PUBLICATIONS

Filing Receipt, Specification and Drawings for U.S. Appl. No. 17/892,790, filed Aug. 22, 2022, entitled "Method to Improve Efficiency of Hydraulic Fracturing Spread with Electric Pumps," 40 pages.
First Office Action dated Aug. 16, 2024 (31 pages), U.S. Appl. No. 17/864,750, filed Jul. 14, 2022.

* cited by examiner

METHOD TO CONTROL HYDRAULIC FRACTURING SPREAD WITH ELECTRIC PUMPS

CROSS-REFERENCE TO RELATED APPLICATIONS

None.

BACKGROUND

Subterranean hydraulic fracturing is conducted to increase or "stimulate" production from a hydrocarbon well. To conduct a fracturing process, high pressure is used to pump special fracturing fluids, including some that contain propping agents ("proppants") down-hole and into a hydrocarbon formation to split or "fracture" the rock formation along veins or planes extending from the well-bore. Once the desired fracture is formed, the fluid flow is reversed and the liquid portion of the fracturing fluid is removed. The proppants are intentionally left behind to stop the fracture from closing onto itself due to the weight and stresses within the formation. The proppants thus literally "prop-apart", or support the fracture to stay open, yet remain highly permeable to hydrocarbon fluid flow since they form a packed bed of particles with interstitial void space connectivity. Sand is one example of a commonly-used proppant. The newly-created-and-propped fracture or fractures can thus serve as new formation drainage area and new flow conduits from the formation to the well, providing for an increased fluid flow rate, and hence increased production of hydrocarbons.

The hydraulic fracturing process can be performed with a hydraulic fracturing fleet comprising multiple types of pumping equipment. A need exists to optimize the performance of the fracturing fleet comprising two or more different types of pumping equipment to obtain one or more performance objectives.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
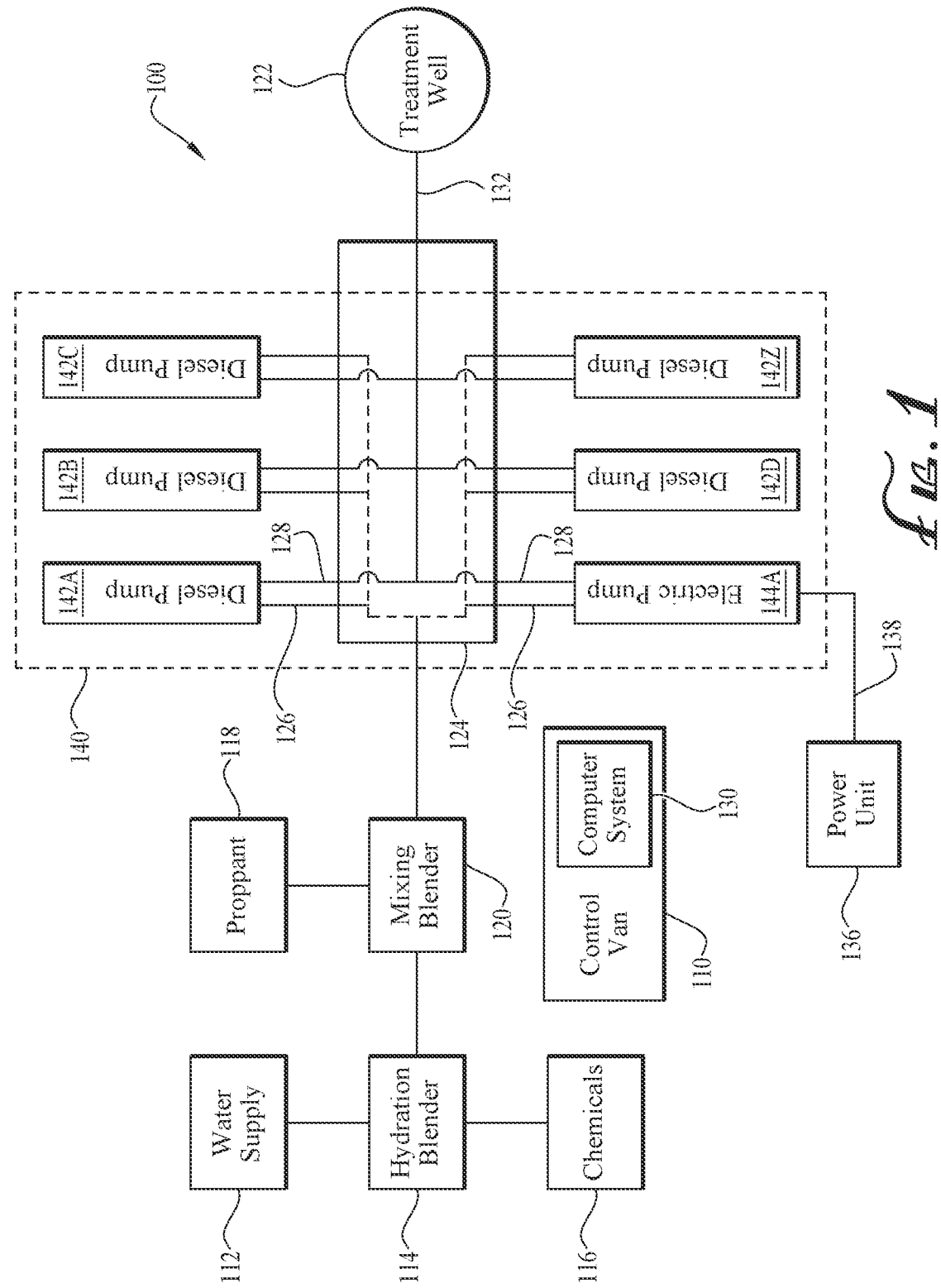
FIG. 1 is a block diagram of a hydraulic fracturing system treating one well according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A modern fracturing fleet typically includes a water supply, a proppant supply, one or more blenders, a plurality of pump units, and a fracturing manifold connected to the wellhead. The individual units of the fracturing fleet can be connected to a central control unit called a data van. The control unit can control the individual units of the fracturing fleet to provide proppant slurry at a desired rate to the wellhead. The control unit can manage the pump speeds, chemical intake, and proppant density while pumping fracturing fluids and receiving data relating to the pumping operation from the individual units.

A modern fracturing fleet can utilize multiple types of pumping equipment to maximize operational use of equipment and personnel. The fracturing fleet can comprise available pumping equipment, e.g., pump units, of various pumping capabilities and powered by diesel motors, electric motors, or hydraulic motors. The term pump unit can refer to pumping equipment with a power end and a motor section coupled to a fluid end that is configured to pump a treatment fluid into a wellbore. An electric frac pump can be a pump unit with an electric motor coupled to a fluid end of a pump. A diesel frac pump can be a pump unit with a diesel motor and transmission coupled to a fluid end of a pump. The fracturing fleet can comprise a plurality of pump units with at least one electric frac pump. The diesel frac pump can have a different power input (e.g., horsepower) and reaction time than an electric frac pump. The output, e.g., the pressure and flow rate of the treating fluid, of the plurality of pump units can vary depending on the type (diesel frac pump or electric frac pump), the capacity, the power input, the service history, or combinations thereof. A method to optimize the output of pump units based on the power requirements of the motor is needed.

The fracturing fleet can comprise a plurality of pump units divided into a diesel pumping group and an electric pumping group. The diesel pumping group can comprise a portion of the plurality of pump units. The electric pumping group can comprise at least one electric frac pump. The operation of the fracturing fleet comprising a diesel pumping group and an electric pumping group can result in pumping inefficiencies, delayed transitions when changing pump flowrates, and higher operating costs due to the fuel costs associated with the power requirements of the pump units. A method for optimization of the fracturing fleet with at least one electric pump is needed. One solution to reducing the operating cost can utilize an optimization process executing on a computer system within a data van communicatively connected to the fracturing fleet. The optimization process can direct the pumping operation of the plurality of pump units. In some embodiments, the optimization process can model the operating cost of the diesel pumping group for a given operating setpoint, e.g., pressure and flow rate, based on historical data and/or a predetermined value. The optimization process can determine the operating cost of the electric pumping group from the operating setpoints and direct measurement of the instantaneous power of each of the electric frac pumps. The optimization process can modify the flowrate of each pump unit to increase or decrease the usage of the pump unit to lower the operating cost of the fracturing fleet. The optimization process can determine an optimum operating cost for each setpoint of the pumping operation.

Figure 5:
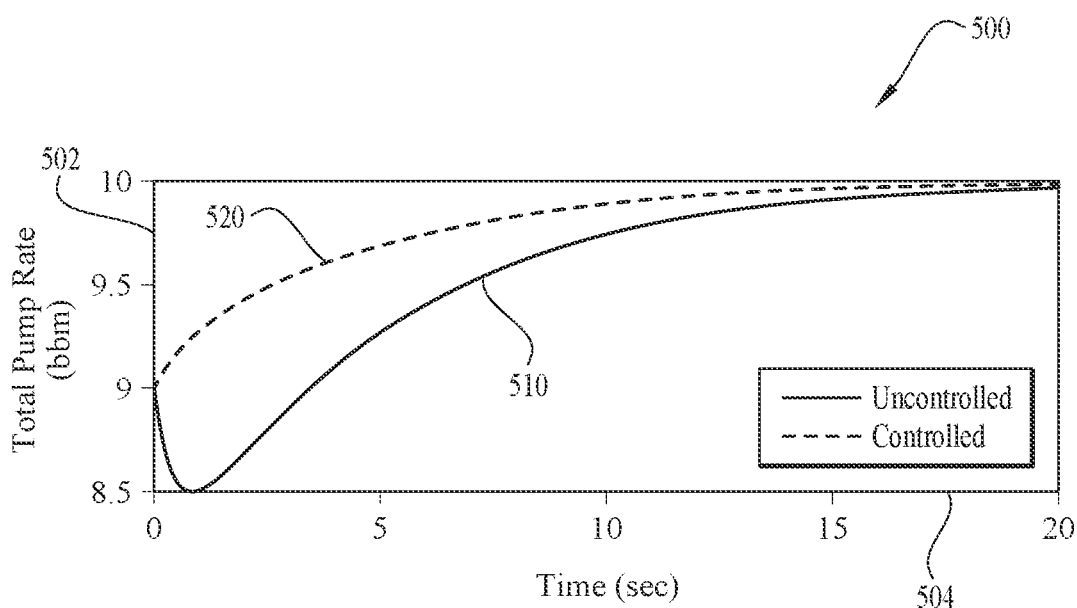
FIG. 5 is an illustration of an uncontrolled transition to an operational setpoint according to an embodiment of the disclosure.

The transition from a first flowrate to a second flow rate by the fracturing fleet can cause a dip in the pressure and flowrate of the wellbore treatment fluid. For example, the electric pumping group can react to a new flowrate faster than the diesel pumping group. The diesel pumping group may experience a delay in establishing a new flowrate as the diesel motors increase the speed of rotation of the drive shaft and, in some cases, change gears within the transmission. As shown in FIG. 5, an uncontrolled transition 510 of flowrate (axis 502) can experience a dip or reduction in flowrate for a time period (axis 504) with each new flowrate. A method of optimizing the flowrate transition to prevent a dip in the flowrate is needed. One solution to controlling the flowrate transition can utilize the optimization process to control each pump unit during the transition. In an embodiment, the optimization process can determine a control function for each pump unit based on the type of pump unit, e.g., diesel frac pump or electric frac pump. The optimization process can send an interim flowrate to each pump unit and then measure the flowrate at each pump unit. The optimization process can send a second interim flowrate based on the measured flowrate and the modeled flowrate. The optimization process can continue to iterate the flowrate to enable a controlled transition 520 until the flowrate is steady state. The optimization process can ensure a smooth and faster transition of flowrate from one pumping stage to another pumping stage of the pumping operation when the fracturing fleet comprises a mixture of diesel frac pumps and electric frac pumps.

The central control unit can establish a flowrate at a setpoint of a pumping stage with the electric pumping group. The electric pumping group can comprise at least two electric frac pumps. Each electric frac pump may operate with different pumping efficiency based on the electric motor, the power end, the fluid end, the age of the pump unit, or combinations thereof. The less efficient electric frac pumps can increase the cost of the pumping operation. A method of optimizing the pumping operation based on the pumping efficiency of the electric pumps is needed. One solution to lower the cost of the pumping operation with electric frac pumps can utilize the optimization process to shift the pumping operation away from less efficient electric pumps. In an embodiment, the optimization process can determine the pump efficiency from a dataset retrieved from the variable function drive controlling the electric motor. The optimization method can measure the power usage, calculate the hydraulic power produced by the fluid end, and determine the electric pump efficiency. The optimization method can then transfer the pumping operation, e.g., flowrate, away from the less efficient pumps and toward the more efficient pumps. The optimization process can operate the electric pumping group with higher efficiency, less power/horsepower usage, and potential savings in fuel cost.

Disclosed herein is a method of optimizing a pumping operation with fracturing fleet comprising at least one electric frac pump by shifting the flowrate between pump units based on the operational characteristics of the pump units. A method of reducing the cost of operating a fracturing fleet can comprise determining the cost of operating each pump unit, reducing the flowrate to the pump units with the higher operating cost, and increasing the flowrate to the pump units with the lower operating costs. A method of optimizing the transition from a first flowrate to a second flowrate can utilize at least one transition flowrate to iterate the flowrate for a smooth and positive transition to the second flowrate. A method of increasing the efficiency of the electric pumping group can comprise reducing the flowrate to the pump units with the lower efficiency and increasing the flowrate to the pump units with the higher efficiency.

Described herein is a typical fracturing fleet at a wellsite fluidically connected to a wellbore. The fracturing fleet can comprise a mixture of diesel-powered pump units and electric-powered pump units that can be partially controlled or fully controlled by a process executing on a computer system with feedback of equipment data provided by sensors on the fracturing fleet indicative of a pumping operation. Turning now to FIG. 1, an embodiment of a hydraulic fracturing fleet 100 that can be utilized to pump wellbore treatment fluids into a wellbore, is illustrated. The fracturing fleet, also referred to as a fracturing spread, comprises a chemical unit 116, a hydration blender 114, a water supply unit 112, a mixing blender 120, a proppant storage unit 118, a manifold 124 and a plurality of pump units 140 fluidically connected to a treatment well 122. The treatment well 122 may include a wellhead connector, a production tree, a wellhead, and a wellbore drilled into a porous subterranean formation containing formation fluids. As depicted, the plurality of pump units 140 (also referred to as hydraulic fracturing pumps, "frac pumps", or high horsepower pumps) are connected in parallel to the manifold 124 (also referred to as a "missile" or a fracturing manifold) to provide wellbore treatment fluids, e.g., fracturing fluids, to the treatment well 122. The fracturing fluids are typically a blend of friction reducer and water, e.g., slick water, and proppant. In some cases, a gelled fluid (e.g., water, a gelling agent, optionally a friction reducer, and/or other additives) may be created in the hydration blender 114 from the water supply unit 112 and gelling chemicals from the chemical unit 116. When slick water is used, the hydration blender 114 can be omitted. The proppant is added at a controlled rate from the proppant storage unit 118 to the gelled fluid in the mixing blender 120. The mixing blender 120 is in fluid communication with the manifold 124 so that the fracturing treatment is pumped into the manifold 124 for distribution to the pump units 140, via supply line 126. The fracturing fluids are returned to the manifold 124 from the pump unit 140, via high-pressure line 128, to be pumped into the treatment well 122 that is in fluid communication with the manifold 124 via the high-pressure line 132. A wellhead connector can releasably couple the high-pressure line 132 to the production tree or other high pressure isolation device connected to the wellbore. Although fracturing fluids typically contain a proppant, a portion of the pumping sequence may include a fracturing fluid without proppant (sometimes referred to as a pad fluid). Although fracturing fluids typically include a gelled fluid, the fracturing fluid may be blended without a gelling chemical. Alternatively, the fracturing fluids can be blended with an acid to produce an acid fracturing fluid, for example, pumped as part of a spearhead or acid stage that clears debris that may be present in the wellbore and/or fractures to help clear the way for fracturing fluid to access the fractures and surrounding formation. The sensors on the fracturing fleet can measure the equipment operating conditions including temperature, pressure, flow rate, density, viscosity, chemical, vibration, rotation, rotary position, strain, accelerometers, exhaust, acoustic, fluid level, and equipment identity.

Each of the pump unit 140 comprises a pump power end and a pump fluid end. The pump fluid end of the pump unit 140 includes a pump section with a suction valve, a discharge valve, and fluid sensors. In some embodiments, the pump section is a piston pump with at least one reciprocating piston or plunger that draws treatment fluid into a chamber through the suction valve, pressurizes the fluid within the pump chamber, and discharges the pressurized fluid through the discharge valve. The pump section may include one, two, three, or more pistons or plungers within the pump fluid end. The fluid sensors can measure the fluid pressure at the suction valve, the pump chamber, the discharge valve, or combinations thereof. In some embodiments, the pump section comprises a single stage centrifugal pump with an impeller (also referred to as a rotor) coupled to a drive shaft and a diffuser coupled to a housing. In some embodiments, the pump section comprises a multiple stage centrifugal pump. In some embodiments, the pump section comprises a centrifugal pump, a progressive cavity pump, an auger pump, a rod pump, a turbine pump, a screw pump, a gear pump, or combinations thereof.

The pump power end of the pump unit 140 provides rotational power for the pump section. In some embodiments, the pump power end comprises a motor with a drive shaft coupled to a flywheel with a crank shaft arm mechanically coupled to the reciprocating piston or plunger. The rotational motion of the flywheel provides the reciprocating motion for the piston or plunger via the crank shaft arm. One or more positional sensors can measure the angular position, rotational position, rotational speed, or combinations thereof of the drive shaft, flywheel, crank shaft arm, or combinations thereof. The positional sensors can include a rotary encoder, a shaft encoder, a rotary potentiometer, a resolver, a rotary variable differential transformer, or combinations thereof. The rotary encoder may be an absolute rotary encoder that measures the current shaft position or an incremental encoder that provides information about the motion of the shaft, e.g., rotational position, speed, and angular distance. In some embodiments, the pump power end comprises a motor with a drive shaft directly coupled to the pump section of the fluid end. For example, the pump power end may be directly coupled to a pump shaft of a centrifugal pump. The pump power end can include a diesel or electric motor to provide the rotational power.

In some embodiments, the plurality of pump units 140 includes at least one diesel frac pump 142 comprising a pump power end with a diesel motor and transmission mechanically coupled to the flywheel/crank shaft to provide rotational motion to the pump section. In some embodiments, the diesel motor provides rotational motion for a pump fluid end with a piston pump. In some embodiments, the diesel motor provides rotational motion for a pump fluid end with a single stage or multiple stage centrifugal pump. In some embodiments, the diesel motor provides rotational motion for a pump fluid end with the pump section comprising a centrifugal pump, a progressive cavity pump, an auger pump, a rod pump, a turbine pump, a screw pump, a gear pump, or combinations thereof.

In some embodiments, the plurality of pump units 140 includes at least one electric frac pump 144 comprising a pump power end with an electric motor mechanically coupled to the fluid end to provide rotational motion to the pump section. A variable frequency drive (VFD) may communicatively couple the electric motor to a pump control unit on the electric frac pump 144. The VFD can control the torque, speed, and angular position of the drive shaft of the electric motor per directions from the pump control unit. For example, the VFD may establish a rotational speed, e.g., revolutions per minute (RPM), of the drive shaft of the electric motor per direction from the pump control unit. In some embodiments, the electric motor provides rotational motion for a pump fluid end with a piston pump. In some embodiments, the pump power end includes a transmission rotationally coupled to the electric motor. In some embodiments, the electric motor provides rotational motion for a pump fluid end with a single stage or multiple stage centrifugal pump. In some embodiments, the electric motor provides rotational motion for a pump fluid end with the pump section comprising a centrifugal pump, a progressive cavity pump, an auger pump, a rod pump, a turbine pump, a screw pump, a gear pump, or combinations thereof.

In some embodiments, a power unit 136 can be coupled to the electric frac pump 144 by an umbilical cable 138 to provide electrical power to the electric frac pump 144 via the VFD. The power unit 136 can be an electrical generator, an electrical battery, an electrical transformer, or combinations thereof. The power unit 136 may include a electrical generator powered by a hydrocarbon fuel engine or turbine, or a wind power turbine. For example, a diesel engine or natural gas turbine. The power unit 136 may generate electricity via a fuel cell. For example, the power unit 136 may generate electricity via a hydrogen fuel cell or natural gas fuel cell via a chemical reaction. The power unit 136 may include solar panels to generate electricity via the sun. The power unit 136 may include an electrical battery to provide stored electrical power. The power unit 136 may be connected to the power grid, e.g., local power lines, to provide electrical power.

In some embodiments, the plurality of pump units 140 comprises a plurality of diesel frac pumps 142A-Z and at least one electric frac pump 144 fluidically connected to the fracturing manifold 124. The electric frac pump 144 can provide a portion of the volume of treatment fluid delivered to the treatment well 122 via the high-pressure line 132. The remainder of the volume of treatment fluid can be provided by the plurality of diesel frac pumps 142A-Z.

In some embodiments, the plurality of pump units 140 comprise a plurality of electric frac pump 144A-Z and at least one diesel frac pump 142. The diesel frac pump 142 can provide a portion of the treatment fluid to the treatment well 122 with the electric frac pumps 144A-Z providing the remainder.

A control van 110 can be communicatively coupled (e.g., via a wired or wireless network) to any of the frac units of the fracturing spread wherein the term "frac units" may refer to any of the plurality of pump units 140, the manifold 124, the mixing blender 120, the proppant storage unit 118, the hydration blender 114, the water supply unit 112, and the chemical unit 116. Each of the frac units can have a control unit, e.g., a computer system, that establishes control of the equipment, e.g., pumping equipment, and receives data from equipment sensors, e.g., flow rate sensors. A managing process executing on a computer system 130 within the control van 110 can establish unit level control over the frac units communicated via the network. Unit level control can include sending instructions to the control unit of each frac unit and/or receiving equipment data via the control unit from the frac units. For example, the managing process on the computer system 130 within the control van 110 can establish a flowrate of 25 bpm with the plurality of pump units 140 while receiving pressure and rate of pump crank revolutions from sensors on the pump units 140. The computer system 130 can also receive data from the wellbore environment from sensors attached to the treatment well 122, located in the treatment well 122, located in one or more observation wells, or combinations thereof. In an example, the computer system 130 may receive data from sensors attached to a production tree of the treatment well 122. In another scenario, the computer system 130 may receive data from downhole sensors, e.g., fiber optic sensors, located within the wellbore of the treatment well 122. The wellhead and downhole sensors can measure the environment inside the treatment well including temperature, pressure, flow rate, density, viscosity, chemical, vibration, strain, accelerometers, and acoustic. In still another scenario, the computer system 130 may receive data from sensors attached to a production tree, located within a wellbore, or combinations thereof on one or more observation wells, e.g., an offset well.

Figure 7:
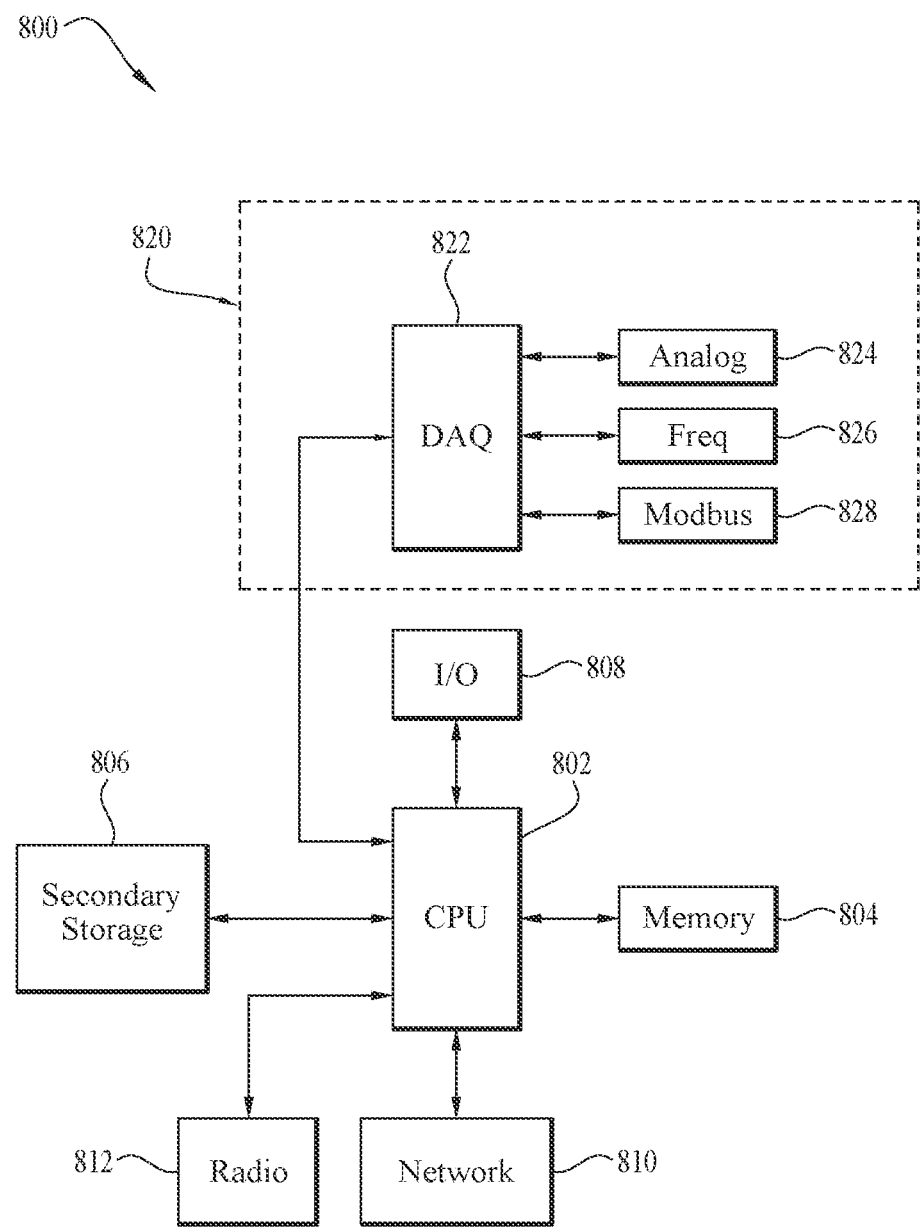
FIG. 7 is a block diagram of a computer system according to an embodiment of the disclosure.

Although the optimization process is described as executing on a computer system 130, it is understood that the computer system 130 can be any form of a computer system such as a server, a workstation, a desktop computer, a laptop computer, a tablet computer, a smartphone, or any other type of computing device, for example the computer system 800 of FIG. 7. The computer system 130 can include one or more processors, memory, input devices, and output devices, as described in more detail further hereinafter. Although the control van 110 is described as having the managing process executing on a computer system 130, it is understood that the control van 110 can have 2, 3, 4, or any number of computer systems 130 with 2, 3, 4, or any number of managing process executing on the computer systems 130.

Figure 2:
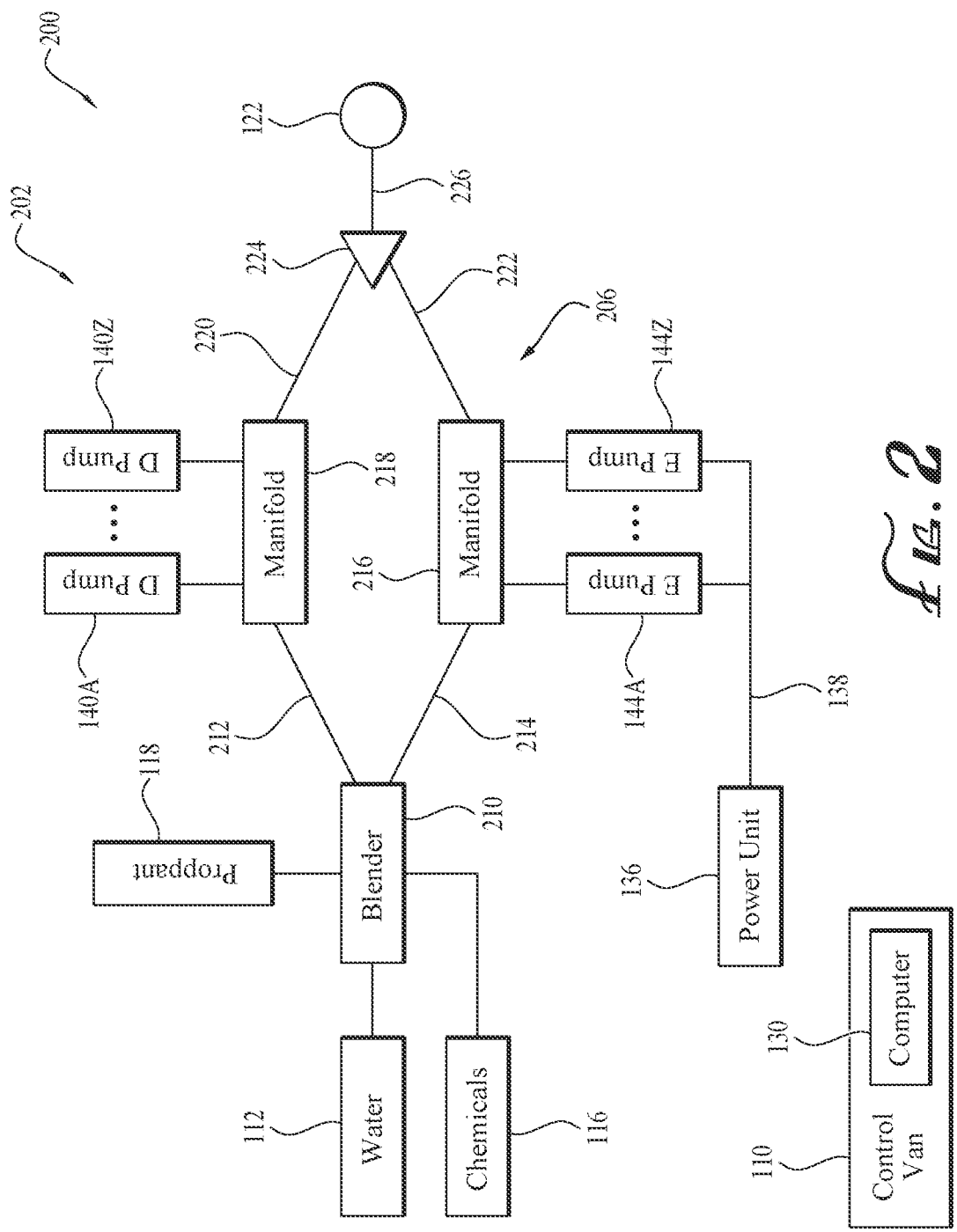
FIG. 2 is another block diagram of a hydraulic fracturing system treating one well according to an embodiment of the disclosure.

The fracturing spread can be divided into two pumping groups that share a blender to pump treatment fluid to treatment well 122. Turning now to FIG. 2, an embodiment of a hydraulic fracturing fleet 200 that can be utilized to pump hydraulic fracturing fluids into a treatment well 122, is illustrated. In some embodiments, the fluid capacity of the mixing blender 210 can be divided between two groups of pump units: a diesel group 202 and an electric group 206. The diesel group 202 can comprise a set of diesel frac pump 140A-Z fluidically connected to a first manifold 218. The electric group 206 can comprise a set of electric frac pumps 144A-Z fluidically connected to a second manifold 216. A power unit 136 can be connected to the set of electric frac pump 144A-Z via an umbilical cable 138. As previously described, the mixing blender 210 can produce a proppant slurry by adding proppant, e.g., sand, from the proppant storage unit 118 to slick water blended from water provided by the water supply unit 112 and a friction reducer from the chemical unit 116. A portion of the proppant slurry can be pumped through feed line 212 to the diesel group 202 via the first manifold 218 and a portion of the proppant slurry can be pumped through feed line 214 to the electric group 206 via the second manifold 216. The total volumetric rate of slurry received by the wellbore of the treatment well 122 cannot exceed the total volumetric rate output of the mixing blender 210. For example, the volumetric rate output of the mixing blender 210 can be limited by the maximum proppant, e.g., sand, mixing rate of the mixing blender 210. Although two diesel frac pumps 140A-Z are shown in the diesel group 202, it is understood that 1, 2, 4, 8, 16, or any number of diesel frac pumps 140A-Z can connect in parallel to first manifold 218. Although two electric frac pumps 144A-Z are shown in the electric group 206, it is understood that 1, 2, 4, 8, 16, or any number of electric frac pumps 144A-Z can connect in parallel to the second manifold 216.

The wellbore of the treatment well 122 can receive a volume of proppant slurry from the first manifold 218 via high-pressure line 220 and a volume of proppant slurry from the second manifold 216 via high-pressure line 222. If the mixing blender 210 is a single mixing source, e.g., a single tub, the proppant slurry received from the first manifold 218 can have the same fluid properties as the proppant slurry received from the second manifold 216. Alternatively, if the mixing blender 210 is a dual mixing source, e.g., two tubs, the proppant slurry received from the high-pressure line 220 (and mixed in a first tub of the blender) can have different fluid properties than the proppant slurry received the high-pressure line 222 (and mixed in a second tub of the blender). As illustrated, the high-pressure line 220 from the first manifold 218 and the high-pressure line 222 from the second manifold 216 are fluidically connected at a wye block 224 to combine the volume of proppant slurry into the wellbore of the treatment well 122 via a combined pressure line 226. It is understood that the wye block 224 and combined pressure line 226 may be omitted and the high-pressure line 220 and high-pressure line 222 can be directly connected to the wellbore via the wellhead and/or production tree of the treatment well 122

As previously disclosed, the control van 110 can be communicatively coupled (e.g., via a wired or wireless network) to all of the frac units of the fracturing spread, e.g., diesel frac pumps 140A-Z and electric frac pumps 144A-Z. The managing process executing on a computer system 130 within the control van 110 can establish unit level control over the frac units via the network. Unit level control can include sending instructions to the frac units and/or receiving equipment data from the frac units. The computer system can receive wellbore environment data from sensors attached to the treatment well 122, located within the treatment well 122, located in at least one observation well, or combinations thereof.

Figure 3:
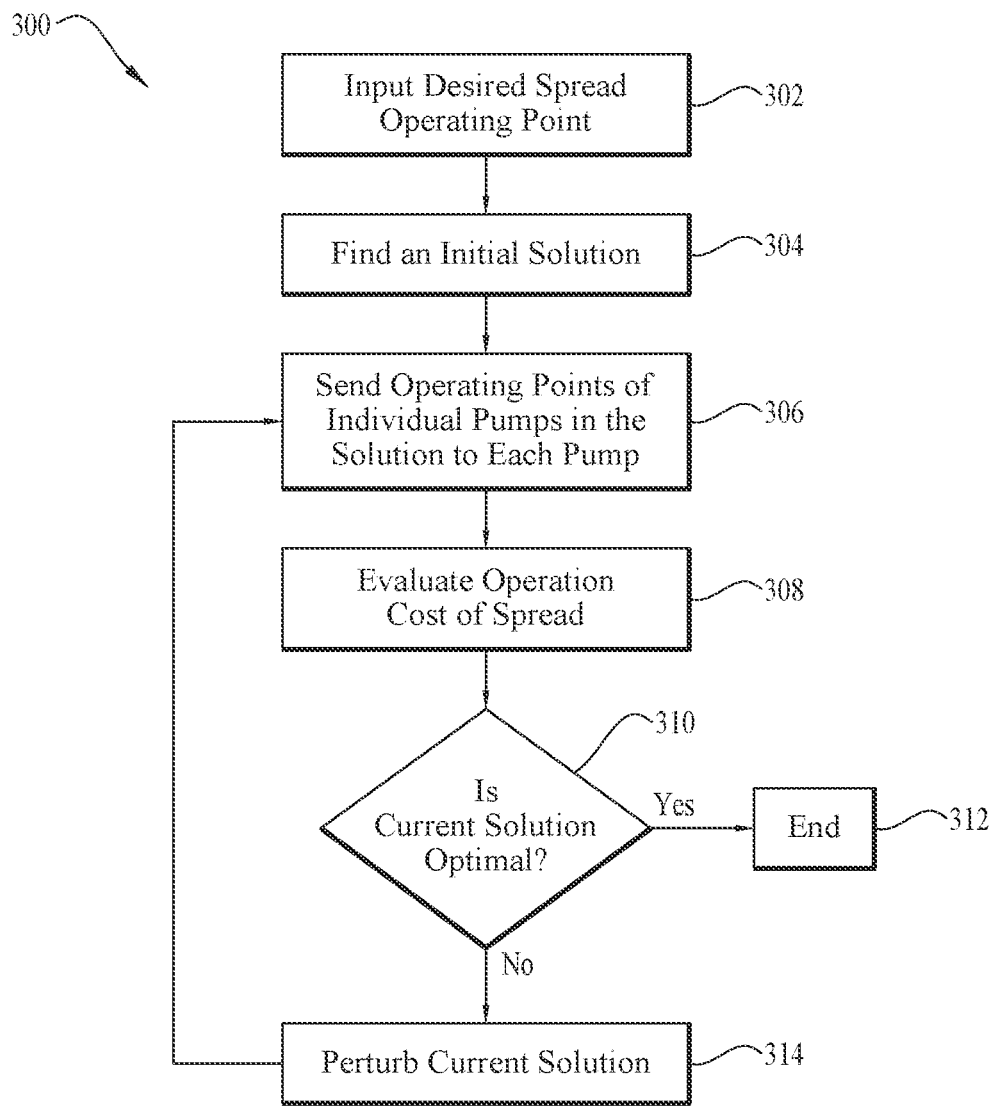
FIG. 3 is a logical block diagram depicting a method of optimizing the output of a fracturing spread according to an embodiment of the disclosure.

The output of the fracturing spread can be optimized by modifying the output of the plurality of pump units to achieve a performance objective such as cost, efficiency, flow rate, or combinations thereof. An optimization process can monitor the output of each pump unit in the fracturing spread, compare the output to a performance objective, and modify the output to achieve an optimum performance for the pumping operation. Turning now to FIG. 3, a method 300 of optimizing a performance objective for a fracturing spread with a set of electrical frac pumps (e.g., electrical frac pumps 144 of FIG. 1) and a set of diesel frac pumps (e.g., diesel frac pumps 142) for a given fluid flow rate is illustrated as a logic block diagram. For example, the method 300 can determine a minimized operating cost for the frac spread. In step 302, the optimization process receives the desired spread operating input, for example, the pressure and total flow rate for a stage in a pumping procedure. A pumping procedure, also called a pumping sequence, may be comprised of a series of pumping stages with a transition between each pumping stage. For example, a pumping sequence may comprise a plurality of time-dependent or volume dependent pumping intervals, also called pumping stages, executed in a consecutive sequence (e.g., over a time period corresponding to a job timeline). The pumping stages may include steady-state stages and transition stages (e.g., having an increasing or decreasing parameter such as flow rate, proppant concentration, and/or pressure) that may be time dependent or volume dependent. The volume dependent pumping stage may be represented as a function of volume, either the delivered volume or the remaining volume. The time dependent pumping stage may be represented as a function of time. The operating setpoint of the pumping stage can include a pressure value, a flow rate value, and a proppant concentration value (e.g., density). The proppant concentration of the fluid delivered to the manifold (e.g., manifold 124) can be provided by a mixing blender (e.g., mixing blender 120). A pumping procedure for the treatment well 122 can be loaded into a managing process executing on the computer system 130 within the control van 110. The pumping procedure can comprise multiple sequential intervals, e.g., pumping stages, comprising pressure, flow rate, and proppant density setpoints based on customer criteria, fracture propagation modeling, prior field results, or a combination thereof.

In step 304, the optimization process can determine an initial solution, e.g., a pressure and a flow rate setpoint, of each of the plurality of pump units. The optimization process may determine if the operating setpoint is within the operational limits of the pump unit, for example, if the pressure setpoint exceeds the operational limit of the electric frac pump 144. In some embodiments, the optimization process may determine where the operating setpoint is within the operational limits of the pump unit. In some embodiments, the initial solution is the operating setpoint, e.g., the pressure and flow rate of the pumping stage. In some embodiments, the initial solution can be to distribute the flow rate according to a previous pumping operation, e.g., historical data. For example, the initial solution can distribute the operating setpoint according to a previous pumping operation utilizing the fracturing fleet. In some embodiments, the optimization process can determine the initial solution by distributing the desired total flowrate among the plurality of pump units 140 wherein the diesel frac pumps 142A-Z and electric frac pumps 144A-Z receive an equal portion of the total flow rate. In some embodiments, the electric frac pumps 144A-Z receive a greater portion of the desired total flowrate than the diesel frac pumps 142A-Z. For example, if the diesel frac pumps 142A-Z are near the operational limit of the diesel motor, transmission gear range, or fluid end, the optimization process can assign a greater portion of the flowrate to the electric frac pumps 144A-Z. In some embodiments, the diesel frac pumps 142A-Z receive a greater portion of the desired total flowrate than the electric frac pumps 144A-Z. For example, if the electric frac pumps 144A-Z are near the operational limit of the electric motor or fluid end, the optimization process can assign a greater portion of the flowrate to the diesel frac pumps 142A-Z.

At step 306, the optimization process can send the operating setpoints, e.g., the desired pressure and flow rate of the pumping stage, to each pump of the plurality of pump units 140. In some embodiments, the optimization process sends the initial operating setpoints from step 304 to at least one of the diesel frac pumps 142A-Z and/or at least one of the electric frac pumps 144A-Z. In some embodiments, the optimization process may transmit an iterative operating setpoint, e.g., a second operating setpoint, to each pump of the plurality of pump units 140. For example, the optimization process may iterate the initial operating setpoint to a second operating setpoint and transmit the second operating setpoint to each pump unit of the plurality of pump units 140 as will be described herein. In some embodiments, the optimization process may transmit a desired operating setpoint to at least one unit controller of the pump units 140, for example, the diesel frac pump 142A of FIG. 1, and the unit controller of the diesel frac pump 142A may adjust the power (e.g., throttle) to the desired rate, e.g., the desired pressure and flow rate of the pumping stage. In some embodiments, the optimization process may transmit the operating setpoint to each of the plurality of pump units 140 simultaneously or near simultaneously. In some embodiments, the optimization process may determine a transition operating setpoint and transition time for each of the diesel frac pumps 142A-Z and/or electric frac pumps 144A-Z based on the pressure and flow rate response of each pump unit as will be described further herein.

At step 308, the optimization process can optimize the operation of a hydraulic fracturing spread with at least one electric pump by minimizing the operational costs. In some embodiments, the minimized total operating cost of the fracturing spread can be determined for an operating setpoint, e.g., pressure and flow rate for a pumping stage, by iterating the flow rate of the electric frac pumps and the diesel frac pumps within the fracturing spread. Below is an example equation that may be used to determine the minimized total operating cost for a fracturing spread with at least one electric frac unit:

$$\min_{q_i, g_i, q_j} \sum_{i=1}^{N_d} f_{d,i}(p, q) + \sum_{j=1}^{N_e} [f_{e1,j}(p, q_j) + f_{e2,j}(p, q_j)] \qquad \text{Equation 1}$$

subject to $$q_{d,min}(g_i, p) \le q_i \le q_{d,max}(g_i, p), i = 1, \ldots, N_d \qquad \text{Equation 2}$$

$$0 \le q_j \le q_{e,max}(p), j = 1, \ldots, N_e \qquad \text{Equation 3}$$

$$\sum_{i=1}^{N_d} q_i + \sum_{j=1}^{N_e} q_j = Q \qquad \text{Equation 4}$$

wherein $N_d$ is the number of diesel pumps; $N_e$ is the number of electric pumps; $q_i$ is the rate for i-th diesel pump, i=1, . . . , $N_d$; $q_j$ is the rate for j-th electric pump, j=1, . . . , $N_e$; and $g_i$ is the gear index of i-th diesel pump. Equation 1 describes the objective of the optimization problem, which is to minimize the sum of operational cost of individual pumps. The operating cost of the diesel pumps, e.g., diesel frac pump 142A-Z, is pre-determined (e.g., from first principles, from historical data, or combination of both) as a function of operating setpoint (e.g., flow rate q, actual or expected discharge pressure p): $f_d$(p, q). The operating cost includes first principles of the mechanisms utilized to translate mechanical power to provide the fluid power. The first principles comprises an engine model, a transmission model, and a fluid end model. For example, the overall cost of the system comprises the rate of fluid consumption for the engine model to generate RPM, the mechanical losses of the transmission model to translate engine RPM to crankshaft RPM, the pressure losses of the fluid end model to translate crankshaft RPM to fluid power, e.g., fluid flowrate and pressure. The operational cost for diesel frac pumps can be predetermined based on cost function that includes repair and maintenance cost, motor RPM, and crankshaft RPM. For example, the cost of the diesel frac pump operating at a given discharge pressure, flowrate, motor RPM, and transmission gear can be predetermined, e.g., based on historical data. The operating cost of the electric pumps, e.g., electric frac pumps 144A-Z, can be determined from a) a pre-determined function similar to diesel pumps $f_{e1}$(p, q), and b) a variable shown as an unknown cost function $f_{e2}$(p, q), also referred to as the real-time operating cost, which can be evaluated in real time from measured data. For example, a portion of the operating cost of the electric frac pumps 144 for a given discharge pressure, flowrate, and motor RPM can be predetermined, e.g., based on historical data. The real-time operating cost (the second part of the equation) can be calculated from the power usage measured by the VFD. In some embodiments, the cost of the power can be calculated from the fuel cost, the generation cost, the cost of the purchased electricity, or combinations thereof of the power unit 136.

Equation 2 can represent the rate constraint for diesel pumps, e.g., diesel frac pumps 142A-Z. The diesel pumps, e.g., diesel frac pump 142A-Z, can have multiple gears within the transmission that transfers torque and rotational motion from the diesel motor to the power section, the flow rate $q_d$ must be within the minimum and maximum rate for the gear, denoted by $q_{d,min}(\cdot)$ and $q_{d,max}(\cdot)$ respectively.

Similarly, Equation 3 can constrain the maximum flow rate for the electric pumps, e.g., electric frac pump 144A-Z, for a given operating pressure p. Said another way, the maximum flow rate through a fluid end of an electric frac pump can be limited by the maximum operating pressure. The electric motor of the electric pumps, e.g., electric frac pump 144A-Z, can be mechanically coupled to the power section without a transmission and thus the electric frac pump 144 doesn't have the flow rate limited by gears within a transmission.

In some embodiments, Equation 4 can provide a constraint that states that the sum of individual flow rates of the pump units must satisfy the desired spread flow rate of the fracturing fleet. For example, with reference to FIG. 1, the total flow rate Q of the treatment fluid delivered to the treatment well 122 via the high-pressure line 132 is determined by the summation of the flow rate $q_i$ from the diesel frac pumps 142A-Z and the summation of the flow rate $q_j$ from the electric frac pumps 144A-Z.

In some embodiments, the constraint of Equation 4 can be replaced by a penalty term. The penalty term $w_Q(Q-\Sigma q_i-\Sigma q_j)$ is added to the cost function of Equation 1 if the condition $\Sigma q_i + \Sigma q_j < Q$ is true. Wherein $w_Q$ is a pre-determined weighting factor. In some embodiments, replacing Equation 4 with the penalty term may simplify and/or expedite the solution process.

In some embodiments, at least one additional penalty term can be added to the cost function of Equation 1 to capture a transitional cost. A transitional cost may occur along a range of pressures, flow rates, pump section RPMs, power section RPMs, drive shaft RPMs, or combinations thereof. For example, if one wants to avoid resonance due to at least two pumps running at the same rate, additional penalty $w_R \Sigma v_{ij}$ can be added, where $w_R$ is a pre-determined weighting factor and $$v_{ij} = \begin{cases} 0, \text{ if } |q_i - q_j| > 0.1 \text{ bpm and } q_i > 0 \text{ and } q_j > 0 \\ 1, \text{ if } |q_i - q_j| \leq 0.1 \text{ bpm and } q_i > 0 \text{ and } q_j > 0 \end{cases} \quad \text{Equation 5}$$

wherein barrels per minute (BPM) is the flow rate of the pump unit. Although the additional penalty $w_R \Sigma v_{ij}$ is written (Equation 5) in terms of flow rate $q_i$ and $q_j$, it is understood that the additional penalty term may be written in terms of pressure, flow rate, RPM, torque, or any combination thereof.

In some embodiments, the cost for diesel pumps $f_{d,i}(p, q)$ of Equation 1 may include repair and maintenance cost of the power end and/or fluid end and/or the fuel cost of the diesel pumps, e.g., diesel frac pumps 142A-Z. In some embodiments, the fuel cost can include more than one type of hydrocarbon fuel, for example, with a dual-fuel motor that can utilize propane, methane, or natural gas.

In some embodiments, the unknown cost function $f_{e2}(p, q)$ of Equation 1 for the electric pumps, e.g., electric frac pumps 144A-Z, can include actual power usage measured by the VFD that delivers the power to the electric motors from the power unit 136. The cost function can include the cost of electricity, for example, the cost of the electricity from the power grid. The cost function can include the cost of the fuel to power the electrical power generation by the power unit 136, for example, the cost of the natural gas utilized by an electric gas turbine.

The minimized total operating cost of the fracturing spread (at step 308) can be determined with Equations 1-4 for an operating setpoint, e.g., pressure and flow rate for a pumping stage, by iterating the flow rate of the electric frac pumps $q_j$, the flow rate of the diesel frac pumps $q_j$, and the gear index $g_i$ for the diesel frac pumps within the fracturing spread.

At step 310, the method 300 can determine if the operational cost value is optimal. In some embodiments, the optimization process can compare the operational cost value determined in step 308 to a predetermined cost threshold such as a historical cost threshold, a carbon cost threshold, an operational cost threshold, or combinations thereof. The historical cost threshold can include a plurality of operational cost values from previous wellbore treatment operations. The plurality of operational cost values from previous wellbore treatment operations can be stored within a database. The carbon cost threshold can be based on a fracturing spread with all or a portion of the pumping units 140 being diesel frac pumps 142. For example, the carbon cost threshold can be based on a majority (e.g., 51%) of the pumping units 140 being diesel frac pumps 142. The operational cost threshold can be based on a cost target based on a profit target and/or revenue target for the wellbore servicing operation. In some embodiments, the optimization process can determine a gradient cost threshold. The optimization process can determine a numerical gradient for the cost function, Equation 1, in step 308. The optimization process can define the gradient cost threshold as the norm of the numerical gradient for the cost function.

If the optimization process determines that the operational cost value is optimal at step 310, the method 300 ends at step 312.

At block 314, if the optimization process determines that operational cost is not optimal, the method 300 iterates the flow rate $q_i$ for at least one diesel frac pump 142A-Z, the flow rate $q_j$ for at least one electric frac pump 144 A-Z, the gear index $g_i$ for at least one diesel frac pump 142A-Z, or combinations thereof. In some embodiments, the optimization process determines the numerical gradient of the cost function $\nabla f$, selects an appropriate size s, and add to the current solution, i.e., the solution in the next iteration is chosen as $(q_i, q_j) + s \times \nabla f$, assuming there is no gear shift in any of the diesel pumps. In some embodiments, iterations to gear index $g_i$ may be added if $q_i$ is at minimum or maximum rate of the current gear of the diesel frac pumps 142. The optimization process can step to step 306 of the method 300.

The optimization process can transition the fracturing fleet from a first operating setpoint to a second operating setpoint with a plurality of iterative operating setpoints to smooth the transition. In some embodiments, the optimization process can increase or decrease the flowrate delivered to the wellbore with a set number of iterative operating setpoints. For example, when the pump units 140 are in a low stress state, e.g., low pressure and/or flowrates, the optimization process can divide a transition period, e.g., 20 seconds, into equal time segments and increase or decrease the flowrate by waiting till all the pumps reach the same iterative operating setpoint and then waiting till all the pump units reach the iterative setpoint before sending the next iterative setpoint. The optimization process can determine the wait time between iterative operating setpoints based on the type of pump unit. For example, a diesel pump units with smaller plungers within the fluid end can have a slower response time than diesel pump units with larger plungers. The optimization process can determine the iterative steps and the time between iterative steps based on the pump unit with the slowest response time.

In some embodiments, the optimization process can transition the fracturing fleet to a second operating setpoint by slowing some pump units while increasing the flowrate with other pump units. For example, when the pump units 140 are in a high stress state, e.g., pumping fracturing fluids at a high pressure and/or flowrate, the optimization process can decrease the flowrate to one or more pump units with a fluid end near the operational limit and increase the flowrate of the remaining pump units. The optimization process can determine the response time of each pump unit 140 based on a pump performance curve, e.g., a curve representing the pressure values and flowrate values, a mathematical model, a predictive model, or combinations thereof.

Figure 4A:
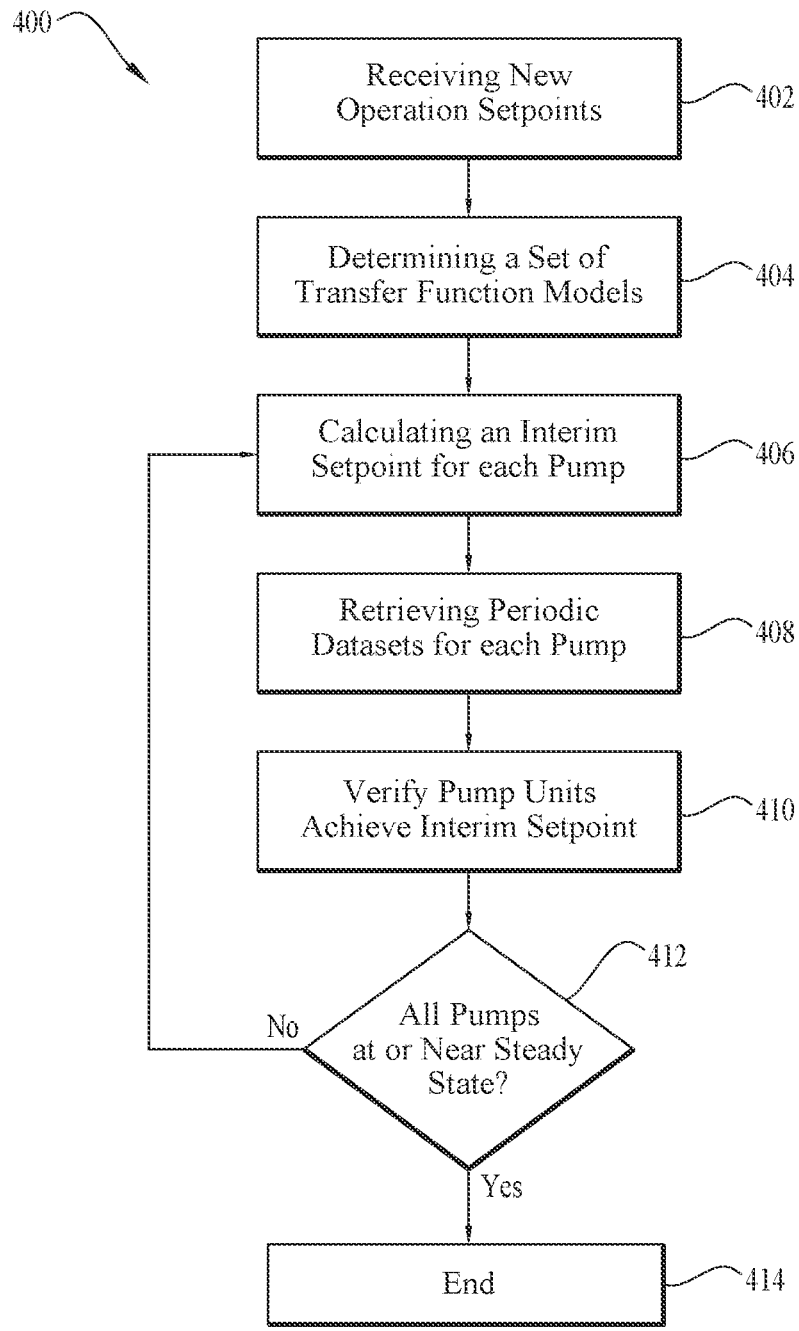
FIG. 4A is a logical block diagram depicting a method of optimizing a transitional flowrate of a fracturing spread according to an embodiment of the disclosure.
Figure 4B:
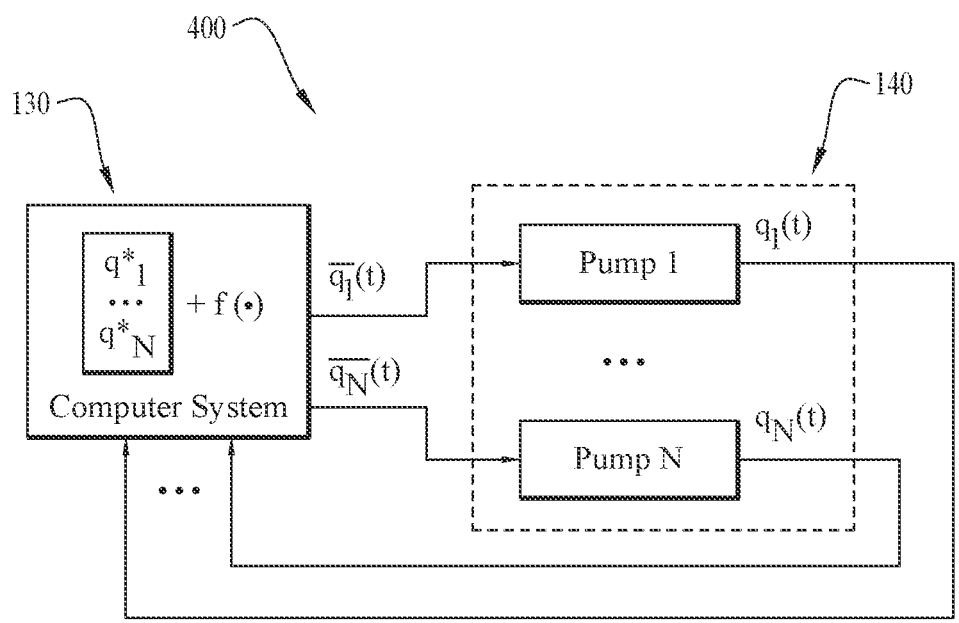
FIG. 4B is a block diagram of a computer system communicating with at least two pump units according to an embodiment of the disclosure.

In some embodiments, the optimization process can direct the pumping operation to deliver a fracturing treatment to a wellbore with a pumping procedure comprising multiple stages. In some embodiments, the optimization process can increase the flowrate to the wellbore of the treatment well 122 by reducing the flowrate to at least one pump unit while increasing the flowrate to the remaining pump units 140. For example, the pumping procedure can decrease the flowrate to one electric frac pump 144A while increasing the flowrate to diesel frac pump 142A and diesel frac pump 142B. The net effect of the decrease in flowrate to the electric pump 144A can be an increase in the flowrate to the treatment well 122. Returning to step 306, in some embodiments, the optimization process may send the desired fracturing spread operating setpoint, a delayed operating setpoint, or an interim operating setpoint to the at least one electric frac pump 144A and/or the at least one diesel frac pump 142A to produce a positive rate change, e.g., an increase in flowrate. Turning now to FIGS. 4A & 4B, an embodiment of step 306 of method 300 for optimizing the pump unit 140 output to achieve a performance objective of a positive rate change is illustrated. For example, FIG. 4A is a logic flow diagram of a method 400 for optimizing the output of the plurality of pump units 140 to achieve a desired fracturing spread setpoint with a positive flowrate transition, e.g., transitioning from a lower flowrate to a higher flowrate.

At step 402, the optimization process can receive a new operating setpoint, e.g., a combination of a pressure value and flowrate value, for the fracturing fleet per a stage of the pumping procedure. The optimization process can determine an plurality of interim operating setpoints for each of the N pump units 140, wherein the interim operating setpoint is a positive change from the initial or previous setpoint. For example, the N pump units 140 of the hydraulic fracturing spread can receive an interim operating setpoint at time t=0, wherein the interim rate setpoint for i-th pump be $q_i^*$, i=1, . . . , N, and net rate change is positive.

At step 404, the transfer function models for each pumping unit of the fracturing fleet can be determined based on the type of pump, the number of increasing pump units, and the number of decreasing pump units as will be disclosed herein after.

At step 406, the optimization process can determine an interim flow rate setpoint for each of the pump units 140 with the transfer function models. The optimization process can iterate the interim setpoints from a first interim setpoint to a second interim setpoint by inputting the current flowrate, e.g., the flowrate from the first interim setpoint, into the transfer function models. As illustrated in FIG. 4B, the optimization process executing on computer system 130 can determine a second interim pump flow rate from the measured pump flow rate $q_i(t)$ and the instantaneous rate setpoint $\overline{q}_i(t)$ for i-th pump at time t. The second interim pump flow rate can be different or the same as the first interim pump flow rate. For example, the second interim pump flow rate can be increasing if the operating setpoint comprises an increasing flowrate. In another scenario, the second interim flowrate can be the same as the first interim pump flowrate if the operating setpoint comprises an unchanging flowrate, e.g., the same flowrate. In still another scenario, the second interim flowrate can be decreasing if the if the operating setpoint comprises a decreasing flowrate.

At step 408, the optimization process can transmit the interim flow rate setpoint $\overline{q}_i(t)$ to each (i-th pump, i=1, . . . , N) of the pump units 140. For example, the optimization process may transmit the second interim flow rate setpoint to each of the pump units 140.

At step 410, the optimization process can monitor the flowrate from each of the pump units 140. In some embodiments, the optimization process can retrieve a sensor dataset indicative of the pumping operation for each of the plurality of pump units 140. For example, the optimization process can retrieve the measured flow rate $q_i(t)$ for each of the pump units 140, e.g., i=1, . . . , N. The sensors can be located on the pump motor, the power end, the fluid end, or combinations thereof. For example, the sensor can be a positional sensor located on the drive shaft of the motor. In another scenario, the sensor can be a positional sensor located on the power end of at least one of the pump units 140. In still another scenario, the sensor can be a flowrate sensor coupled to the fluid end of each of the pump units 140. In another scenario, the sensor can be a flow rate sensor coupled to the high-pressure line 128.

At step 412, the optimization process can determine if the interim setpoint has reached the desired fracturing spread operating setpoint, e.g., the target setpoint. For example, the optimization process can determine if the interim setpoint is within a threshold value of the desired fracturing spread operating setpoint. In some embodiments, reaching the desired fracturing spread operating setpoint can be near or at a steady state flow rate value.

If the interim setpoint is not within the threshold of the desired fracturing spread operating setpoint, the method 400 can return to step 404. If the interim setpoint is within the threshold of the desired fracturing spread operating setpoint, the method 400 can end and step to block 414.

Returning to the disclosure of step 404, the optimization process can determine the transfer function models for each of the pump units. In some embodiments, the optimization process can determine a control law based on the flow rate of the rate setpoint. In some embodiments, the optimization process can determine the control law $f(\cdot)$ based on actual pump flowrate $q_i$ at t=0 and an interim pump flowrate $q_i^*$. For example, the control law $f(\cdot)$ can be written as $$\begin{bmatrix} \overline{q_1}(t) \\ \vdots \\ \overline{q_N}(t) \end{bmatrix} = f[q_1(t), q_2(t), \dots q_N(t), q_1^*, q_2^*, \dots, q_N^*, t] \quad \text{Equation 6}$$

wherein $q_i(t)$ denotes the measured pump flow rate for i-th pump at time t, and $\overline{q_i}(t)$ is the instantaneous rate setpoint for pump i. The control law is designed such that the sum of flow rate $\Sigma q_i(t)$ (i.e., the flow rate of spread) will not be lower than the initial flow rate $\Sigma q_i(0)$. The optimization process can determine an initial interim pump flow rate based on the new rate setpoint for the fracturing spread and the control law $f(\cdot)$. The initial interim pump flow rate can be called the first interim pump flowrate. The control law of Equation 6 is a generalized equation for the method to determine the interim setpoints configured to smooth the transition from one setpoint to another.

In some embodiments, the control law $f(\cdot)$ can be a Laplace transform in the form of a matrix. An example of the Laplace transform of controller $f(\cdot)$ can be a matrix of linear transfer functions $$F(s) = \mathcal{L}[f(t)] = \begin{bmatrix} F_{11}(s) & \dots & F_{1N}(s) \\ \vdots & \ddots & \vdots \\ F_{N1}(s) & \dots & F_{NN}(s) \end{bmatrix} \quad \text{Equation 7}$$

wherein $\mathcal{L}[\cdot]$ denotes Laplace transform operator and s is the complex frequency variable in Laplace transform. Correspondingly, the relationship between controller input and output in Laplace domain is $$\begin{bmatrix} \overline{q_1}(t) \\ \vdots \\ \overline{q_N}(t) \end{bmatrix} = \begin{bmatrix} F_{11}(s) & \dots & F_{1N}(s) \\ \vdots & \ddots & \vdots \\ F_{N1}(s) & \dots & F_{NN}(s) \end{bmatrix} \begin{bmatrix} q_1(s) \\ \vdots \\ q_N(s) \end{bmatrix} + \begin{bmatrix} q_1^*(s) \\ \vdots \\ q_N^*(s) \end{bmatrix} \quad \text{Equation 8}$$

At step 404, the transfer function models for each pumping unit of the fracturing fleet can be determined based on the type of pump, the number of increasing pump units, and the number of decreasing pump units. In some embodiments, elements $F_{ij}(s)$ in Equation 8 can be determined by steps 404A through 404E:

At step 404A, the optimization process can determine if each pump is at the operational set point of the target stage or within a threshold value of the operational set point. The status of each pump at the operational setpoint of the target stage can be referred to as steady-state. When the pump reaches steady-state, the optimization process can end the transition process and maintain the operating setpoint for the pump. Stated another way, the optimization process can set the value to zero, set $F_{ij}(s)=0$, $j=1, \dots, N$, namely $\overline{q_i}(s)=q_i^*(s)$, if the rate of i-th pump $q_i$ is at or near steady state and $q_i$ is near its final setpoint $q_i^*$.

At step 404B, the optimization process determines a model for each of the pump units with increasing flowrates referred to as the increasing pump units. If the interim setpoint flowrate is greater than the current flowrate, the optimization process can determine a linear transfer function model for each type of pump unit, e.g., diesel or electric, for the increasing pump units. The linear transfer function model for each pump unit can be generalized as $$G_{up}(s) := \frac{q_i(s)}{q_i^*(s)}, i \in \{\text{tuple of pumps with rate going up}\}. \quad \text{Equation 9}$$

The linear transfer function $G_{up}(s)$ is normally in the form $$\frac{1}{1+T_i s}$$

so that pump flowrate feedback can track the pump flowrate setpoints with the response time denoted as $T_i$. The transfer function model for diesel pumps with the flowrate increasing is $$G_{up}(s) = \frac{1}{5s+1} \quad \text{Equation 10}$$

The transfer function model for electric pumps with the flowrate increasing is $$G_{up}(s) = \frac{1}{0.5s+1} \quad \text{Equation 11}$$

In some embodiments, the linear transfer function can be set to $G(s)=1$ to simplify the solution.

At step 404C, the optimization process determines a model for each of the pump units with decreasing flowrates referred to as the decreasing pump units. If the interim setpoint flowrate is less than the current flowrate, the optimization process can determine a linear transfer function model for each type of pump unit, e.g., diesel or electric, for the decreasing pump units. The linear transfer function model for each pump unit can be generalized as $$G_{down}(s) := \frac{q_i(s)}{q_i^*(s)}, \quad \text{Equation 12}$$

$i \in \{\text{tuple for pumps with rate going down}\}.$

The format of $G_{down}$ is the same as $G_{up}$. The transfer function model for diesel pumps with the flowrate decreasing is $$G_{up}(s) = \frac{1}{5s+1} \quad \text{Equation 13}$$

The transfer function model for electric pumps with the flowrate decreasing is $$G_{up}(s) = \frac{1}{0.5s+1} \quad \text{Equation 14}$$

At step 404D, the optimization process determines an interim setpoint for each pump unit so that the flowrate of the increasing pump units is replacing the flowrate of the decreasing pump units while increasing the overall flowrate to the target setpoint. Said another way, the linear transfer function model of each pump unit governs the rate at which the select a transfer function $G_{ij}(s)$ such that all the zeros of transfer function $$\sum_{i \in \{pumps\ up\}} G_{up}(s)\Delta q_i^* + \sum_{i \in \{pumps\ down\}} G_{down}(s)\Delta q_i^* +$$
$$\sum_{i \in \{pumps\ up\}, j \in \{pumps\ down\}} G_{down}(s)(C_{ji}(s)G_{up}\Delta q_i^*)$$

Equation 15 are in the left half-plane (LHP) and steady-state gain of $G_{ij}(s)$ is 0, which use the information of actual pump rate of the increasing pump units to create transient setpoints change on the decreasing pump units. $\Delta q_i^*$ is the of net rate setpoint change of individual pumps. In some embodiments, the optimization process can use a simulator or a model (for example, a software package such as MATLAB) to determine the transfer function $G(s)$.

At step 404E, the optimization process can determine if each pump is at the operational set point of the target stage or within a threshold value of the operational set point. When the pump reaches steady-state, the optimization process can end the transition process and maintain the operating setpoint for the pump. Stated another way, the optimization process can for i-th pump, if $q_i^* \geq q_i$, set $F_{ij}(s)=0$, $j=1, \ldots, N$; if $q_i^* < q_i$, set $F_{ij}(s) = C_{ij}(s)$, namely $$F_{ij}(s) = \begin{cases} 0, & \text{if } q_j^* \leq q_j \\ C_{ij}(s), & q_i^* < q_i \end{cases}$$

Equation 16

The transfer function models for the fracturing fleet can be determined with the Laplace transform operation of equation 8 as described with steps 404A through 404E. For example, the fracturing fleet can have two diesel pumps, e.g., diesel frac pump 142A and 142B, and one electric frac pump, e.g., electric frac pump 144A. In the example, assume $q_1|_{t=0} = q_2|_{t=0} = q_3|_{t=0} = 3$ bpm, and $q_1^* = 3$ bpm, $q_2^* = 5$ bpm, and $q_3^* = 2$ bpm. The transfer function for diesel pumps, diesel frac pump 142A and 142B, to increase rate is $$G_{up}(s) = \frac{1}{5s+1},$$

while the transfer function for electric pumps to decrease rate is $$G_{down} = \frac{1}{0.5\ s+1}.$$

By using the method above, the transfer function model $G(s)$ in Step 404D can be chosen as $$C_{32}(s) = \frac{2.5\ s}{0.1\ s+1}$$

based on Equation 15. The transfer function matrix of the controller is $$F(s) = \begin{bmatrix} 0 & 0 & 0 \\ 0 & 0 & 0 \\ 0 & \frac{2.5s}{0.1s+1} & 0 \end{bmatrix}$$

In some embodiments, the control law $f(\cdot)$ can be a Laplace transform in the form of a matrix with the elements $F(s)$ in Equation 8 designated as a diagonal matrix in the step 404R through 404U:

At step 404R, if the rate of i-th pump $q_i$ is at or near steady state and $q_i$ is near its final setpoint $q_i^*$, no new control action is needed. Set $F_{ij}(s)=0$, $j=1, \ldots, N$, namely $\overline{q_1}(s) = q_i^*(s)$.

At step 404S, determine a linear transfer function model of pumps with final rate setpoints greater than current rates. Denote the pump model as $$G_{up}(s) := \frac{q_i(s)}{q_i^*(s)},$$

Equation 9

$i \in$ {tuple of pumps with rate going up}.

At step 404T, determine a linear transfer function model of pumps with final rate setpoints less than current rates. Denote the model as $$G_{down}(s) := \frac{q_i(s)}{q_i^*(s)},$$

Equation 12

$i \in$ {tuple for pumps with rate going down}.

At step 404U, select a transfer function $G_{ii}(s)$ such that all the zeros of transfer function $$\sum_{i \in \{pumps\ up\}} G_{up}(s)\Delta q_i^* + \sum_{i \in \{pumps\ down\}} \frac{G_{down}(s)}{1 - G_{down}(s)G_{ii}(s)} \Delta q_i^*$$

Equation 17 are in the left half-plane (LHP). Wherein, for i-th pump, if $q_i^* > q_i$, set fit(s)=0, if $q_i^* < q_i$, set $f_{ii}(s) = G_{ii}(s)$.

Figure 6A:
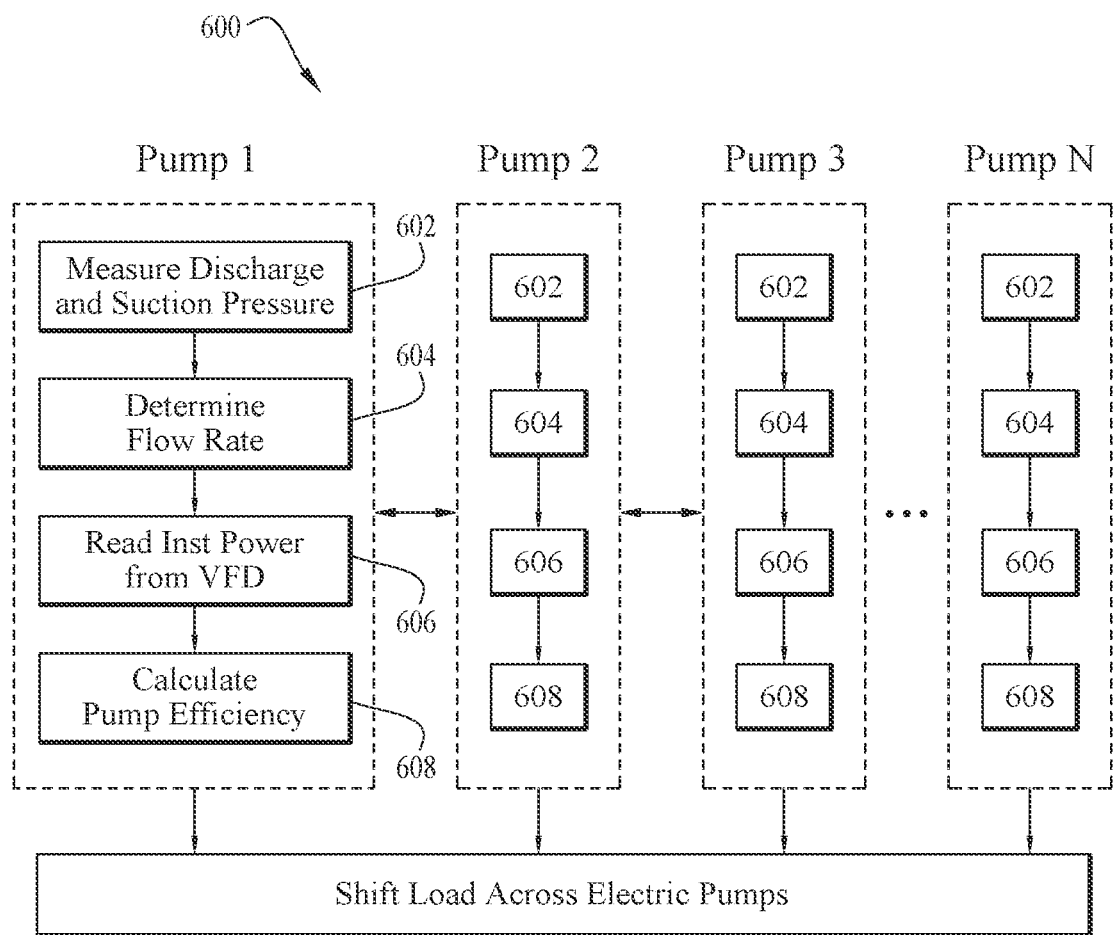
FIG. 6A is a logical block diagram depicting a method of optimizing the efficiency of a group of electric pumps according to an embodiment of the disclosure.

The cost of the operation of the electric frac pumps, e.g., the electric group 206 of FIG. 2, can be reduced by improving the electric motor efficiency. The total horsepower usage of the electric frac pumps 144 within the electric group 206 can be reduced by achieving a higher overall efficiency. The electric group 206 comprises at least two electric frac pumps 144. Turning now to FIG. 6A, a method 600 for improving the overall efficiency of the electric group 206 is illustrated with a logic flow diagram. In some embodiments, the optimization process executing in the computer system 130 of FIG. 2 retrieves the actual power value for each electric motor of the power section of each electric frac pump 144 from the VFD. In a scenario, the optimization process retrieves the actual power value from the VFD. In another scenario, the VFD transmits the actual power value to the optimization process. In still another scenario, the optimization process retrieves the actual power value from the unit controller of each of the electric frac pumps 144. The optimization process can determine the hydraulic power produced by the electric frac pumps 144 by a plurality of datasets obtained from sensors connected to the fluid end of the electric frac pumps 144. The optimization process can determine the efficiency of the electric frac pumps 144 and shift horsepower from less efficient pumps to more efficient pumps to lower the overall horsepower usage.

In step 602, the optimization process can retrieve a dataset indicative of the pumping operation from sensors coupled to the fluid end of the electric frac pumps 144. For example, the dataset can include pressure values from pressure sensors coupled to the suction chamber and the discharge chamber of the fluid end of the electric frac pumps 144. In some scenarios, the pressure transducers can be coupled to the supply line proximate the inlet chamber and the high-pressure line proximate to the discharge chamber.

In step 604, the optimization process can retrieve a dataset indicative of the flow rate through the electric frac pump 144. For example, a flow sensor can be coupled to the supply line feeding the pump, the high-pressure line exiting the pump, or combinations thereof. The flow sensor may be a turbine type or Coriolis type flow meter.

In some embodiments, a positional sensor can be coupled to the drive shaft of the motor, the power end of the pump, or combinations thereof to provide a frequency value for pump strokes. In some embodiments, the dataset for the pump strokes can be retrieved from a positional sensor, e.g., a rotary encoder. In some embodiments, the positional dataset can include a rotational speed of the motor retrieved from the VFD. In an example, the flow rate q(t) can be calculated from the rotational speed of the electric motor:

$$q(t) = \frac{r(t)}{R} \times M \times V \quad \text{Equation 18}$$

wherein r(t) can be the rotational speed read from VFD, R can be a gear ratio, M can represent a number of pump cylinders, and V can be the volume of cylinders. In some embodiments, the electric frac pump 144 can include an equipment monitoring tool, for example Intelliscan by Halliburton, that determines a percentage of the volume of each cylinder filled by fracturing fluids. The optimization process may determine the flow rate q(t) with $$q(t) = \frac{r(t)}{R} \sum_{j=1}^{M} e_j(t) V \quad \text{Equation 19}$$

wherein $e_j(t)$ is the percentage filled for j-th cylinder.

In step 606, the optimization process can retrieve a power value from the VFD for each electric motor of the electric frac pump 144 within the electric group 206. The instantaneous electric power at time t, $P_e(t)$ can be retrieved from the VFD.

In step 608, the optimization process can determine the efficiency of the electric frac pumps 144 by calculating the instantaneous hydraulic power and instantaneous electric power. The instantaneous hydraulic power at time t can be calculated by $$P_h(t) = (p_d(t) - p_s(t))q(t) \quad \text{Equation 20}$$

wherein $p_d$ and $p_s$ are discharge and suction pressure respectively, and q is the flow rate.

The overall efficiency of each of the i-th electric pumps, i.e., electric frac pump 144, can be calculated with $$\eta_i(t) = \frac{P_{h,i}(t)}{P_{e,i}(t)} \quad \text{Equation 21}$$

wherein the instantaneous electric power at time t, $P_e(t)$ is provided by the VFD in step 606.

The optimization process can repeat steps 602 through 608 to determine the efficiency for each electric frac pump 144A-Z of the electric group 206 and store the results in memory or within a database. In some embodiments, the optimization process may rank the electric frac pumps 144A-Z by the efficiency value. In some embodiments, the optimization process may generate an efficiency curve 620 shown in FIG. 6B for each of the electric frac pumps 144A-Z.

At step 610, the optimization process can shift a portion of the flow rate through the electric group 206 from a low efficiency pump to a high efficiency pump and thus lower the horsepower required to provide the operating setpoint of the stage. In some embodiments, the optimization process can repeat steps 602 through 608 for a predetermined number of iterations, until at least one electric pump is idle, until at least two electric pumps have the same calculated efficiency, until the calculated efficiency is below a threshold, or combinations thereof. In some embodiments, the optimization process can determine the numerical gradient of the sum of calculated efficiency $\Sigma \eta_i$ with respect to individual flow-rate. Then, adjust the flowrate setpoint for all pumps according to gradient.

Figure 6B:
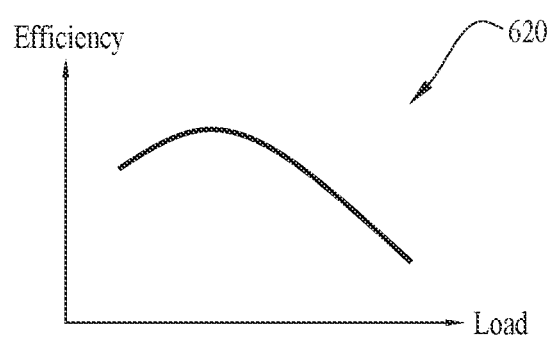
FIG. 6B is an illustration of an efficiency curve for an electric frac according to an embodiment of the disclosure.

In some embodiments, the optimization process may apply an efficiency curve 620 shown in FIG. 6B to each of the electric frac pumps 144A-Z. The optimization process may shift a portion of the flow rate in step 610 by:

In step 610A, the optimization process may select a pump with low efficiency and low horsepower load value per efficiency calculated in step 608 and the efficiency curve 620.

In step 610B, the optimization process may select a pump with low efficiency and high horsepower load value.

In step 610C, the optimization process may reduce the pump flow rate setpoint of high-load pump by a fixed amount (e.g., 0.1 bpm).

In step 610D, the optimization process may increase the pump flow rate setpoint of low-load pump by the same amount as step 610C.

The optimization process may recalculate the efficiency of each electric frac pump 144A-Z based on the new setpoints. In some embodiments, the optimization process may apply an efficiency curve 620 shown in FIG. 6B to each of the electric frac pumps 144A-Z.

The hydraulic fracturing operation comprises designing a wellbore treatment, transporting the wellbore treatment blend to a wellsite, and pumping a wellbore treatment fluid into a porous formation. The wellbore treatment design can include the design of the treatment blend, assignment of the pumping equipment, and a pumping procedure. The design of the treatment blend can comprise the wet or dry treatment materials that can be combined with a liquid, e.g., water, for pumping into the wellbore. In some embodiments, the treatment blend generate a gelled water, a slick-water, or a cementitious material when mixed with water, acid, or other mixing liquid. In some embodiments, the wellbore treatment includes proppant, e.g., sand. The design of the wellbore treatment can include the assignment of pumping equipment to a fracturing fleet. For example, a plurality of pump units 140 can be assigned to a fracturing fleet for the pumping operation. The design of the wellbore treatment can include a pumping procedure, also referred to as a pumping schedule. The pumping procedure can include a multiple time based intervals or volume based intervals for the placement of the wellbore treatment into a target zone within the wellbore of the treatment well. In some embodiments, the target zone is at least one formation beginning and ending at a measured distance from the surface. In some embodiments, the target zone is a subterranean porous formation located at a measured distance from the surface. In some embodiments, the wellbore procedure can be designed to induce fractures within a target zone due to the applied hydraulic pressure, the treatment blend can be designed to transport proppant into the porous formation via the induced fractures, and a volume of proppant can be designed to hold open the induced fractures.

In some embodiments, a volume of wellbore treatment materials, e.g., treatment blend and/or proppant, can be transported to a remote wellbore site with the fracturing fleet. The fracturing fleet can comprise a plurality of pumping units 140 with at least one electric frac pump 144. In some embodiments, the fracturing fleet can comprise a plurality of pumping units with an electric group 206 and a diesel group 202. The fracturing fleet can be assembled at the remote wellsite. The plurality of pumping units 140 can be fluidically connected to the wellbore of the treatment well 122 via a manifold 124 and a high-pressure line 132.

In some embodiments, a managing application executing on a computer system 130 within a control van 110 can be communicatively connected to the frac units of the fracturing fleet. The term frac units can refer to the plurality of pump units, one or more manifolds, a blending unit, a hydration blender, a proppant storage unit, a chemical unit, a water supply unit, a control van, or combinations thereof. The computer system 130 can receive a plurality of datasets from sensors within the frac units indicative of the pumping operation. In some embodiments, the computer system 130 can retrieve a plurality of datasets of the wellbore environment from sensors attached to the wellbore or located within the wellbore. In some embodiments, the managing application can direct the pumping operation per the pumping procedure to mix a treatment blend and pump a treatment blend into the wellbore of the treatment well 122.

In some embodiments, an optimizing process executing on the computer system 130 can optimize the pumping operation to achieve a performance objective such as operating cost, efficiency, a positive flowrate, or combinations thereof. The optimization process can be a part of the managing application, a stand-alone process, or combinations thereof. The optimization process can monitor the sensor measurements (e.g., the fluid output) of each pump unit 140, compare the measurements to a performance objective, and modify the fluid output to achieve the performance objective for the pumping operation. In some embodiments, the performance object can be minimizing the cost of the pumping operation of the fracturing fleet. A method for optimizing the pump performance of the pumping operation comprises receiving an operating setpoint from the pumping procedure. The method comprises determining an initial operating setpoint for each of the diesel frac pumps 142 and each of the electric frac pumps 144, wherein the initial operating setpoint is the operating setpoint or an interim setpoint. The method comprises determining the cost of operating each pump unit 140 wherein a portion of the plurality of pump units 140 are diesel frac pumps 142 and at least one electric frac pump 144. The cost of operating each diesel frac pump 142 is a predetermined cost based on the operating setpoint and historical data. The cost of the electric frac pump 144 is determined by a predetermined cost based on the operating setpoint and the cost of the power provided by the power unit. The method comprises iterating the interim setpoint to lower the cost of operating each pumping unit by decreasing the flowrate to the pump units with greater operating costs and increasing the flowrate to the pump units with lower operating costs. The total flowrate from the plurality of pump units operating with the interim setpoint is the same flowrate as the operating setpoint from the pumping procedure.

In some embodiments, the optimizing process executing on the computer system 130 can optimize the pumping operation to achieve a performance objective such as a positive flowrate transition from a first operating setpoint to a second operating setpoint. In some embodiments, the optimization process can modify an operational setpoint, e.g., a pressure value and a flowrate value, to produce a positive transition of the flowrate from a first operating setpoint to a second operating setpoint by reducing the flowrate to at least one pump unit while increasing the flowrate to the remaining pump units. A method for optimizing the pump performance for each of the plurality of pump units comprises receiving a second operating setpoint that includes a second flowrate that is greater than the current operating setpoint with a first flowrate.

The optimizing process executing on the computer system 130 can utilize a method to optimize the pumping operation to achieve a performance objective such as increased efficiency of the electric frac pumps. In some embodiments, the method to increase the efficiency can comprise receiving an operating setpoint for an interval for a pumping operation. The method can determine an initial setpoint for each of the electric frac pumps wherein the interim setpoint is the operating setpoint equally distributed to each electric frac pump. The method can calculate an efficiency value for each of the electric frac pumps 144 from a hydraulic power value and a measured electric power value. The method can increase a total efficiency of the fracturing fleet above a threshold efficiency value by iterating the interim setpoint from a first interim setpoint to a second interim setpoint for the at least two electric frac pumps 140, wherein the second interim setpoint increases the flowrate to the more efficient electric frac pumps, and wherein the total flowrate through the at least two electric frac pumps for the second interim setpoint is the same as the operating setpoint.

The method of increasing the efficiency of the electric frac pumps further comprises reducing the operating cost of the fracturing fleet in response to maximizing the efficiency of the electric fracturing pumps. The method calculates the operating cost for the electric frac pumps from a predetermined operating cost and a real-time operating cost. The predetermined operating cost is determined by i) a pump flowrate, ii) a pump discharge pressure, iii) a RPM value of a motor, or combinations thereof, and the real-time operating cost comprises a power usage measured by a variable frequency drive (VFD) coupled to the motor.

Turning now to FIG. 7, the computer system 130 and the unit controller for the fracturing units may be a computer system 800 with a processor 802, memory 804, secondary storage 806, and input-output devices 808. The computer system 130 may establish a wireless link with a mobile carrier network (e.g., 5G core network) and/or satellite with a long range radio transceiver 812 to receive data, communications, and, in some cases, voice and/or video communications. The input-output devices 808 of the computer system 130 may also include a display, an input device (e.g., touchscreen display, keyboard, etc.), a camera (e.g., video, photograph, etc.), a speaker for audio, or a microphone for audio input by a user. A network device 810 may include a short range radio transceiver to establish wireless communication with Bluetooth, WiFi, or other low power wireless signals such as ZigBee, Z-Wave, 6LoWPan, Thread, and WiFi-ah. The long range radio transceiver 812 may be able to establish wireless communication with an access node for the mobile carrier network based on a 5G, LTE, CDMA, or GSM telecommunications protocol. The computer system 130 may be able to support two or more different wireless telecommunication protocols and, accordingly, may be referred to in some contexts as a multi-protocol device. The computer system 130 may communicate with another computer system via the wireless link provided by the access node of the mobile carrier network (or satellite) and via wired links provided by 5G core network and a private network, a public network, or combinations thereof. Although computer system 130 is illustrated as a single device, the computer system 130 may be a system of devices. The unit controller for the fracturing units, e.g., pump units 140, may include additional components and functionality such as secondary storage 806 and input-output module 820 as will be disclosed hereinafter.

The access node may also be referred to as a cellular site, cell tower, cell site, or, with 5G technology, a gigabit Node B. The access node provides wireless communication links to the communication device, e.g., radio 812 on the computer system 130 and unit controller, according to a 5G, a long term evolution (LTE), a code division multiple access (CDMA), or a global system for mobile communications (GSM) wireless telecommunication protocol.

The satellite may be part of a network or system of satellites that form a network. The satellite may communicatively connect to the communication device (e.g., radio 812) of the computer system 130, the communication device of the unit controller, the access node, the mobile carrier network, the private/public network, or combinations thereof. The satellite may communicatively connect to the public/private network independent of the access node of the mobile carrier network.

The communication device may establish a wireless link with the mobile carrier network (e.g., 5G core network) with a long-range radio transceiver, e.g., 812 of FIG. 3, to receive data, communications, and, in some cases, voice and/or video communications. The communication device may also include a display and an input device, a camera (e.g., video, photograph, etc.), a speaker for audio, or a microphone for audio input by a user. The long range radio transceiver 812 of the communication device may be able to establish wireless communication with the access node based on a 5G, LTE, CDMA, or GSM telecommunications protocol and/or satellite. The communication device may be able to support two or more different wireless telecommunication protocols and, accordingly, may be referred to in some contexts as a multi-protocol device. The communication device, e.g., radio 812 on a unit controller, may communicate with another communication device, e.g., radio 812 on a unit controller, on a second pump unit via the wireless link and via wired links provided by the mobile carrier network. For example, a pump unit 140A may communicate with pump units 140B, 140C, 140D, 140E, and 140F at the same wellsite or at multiple wellsites. In an embodiment, the pump units 140A-F may be a different types of pump units at the same wellsite or at multiple wellsites. For example, the pump unit 140A may be a frac pump, pump unit 140B may be a blender, pump unit 140C may be water supply unit, pump unit 140D may be a cementing unit, and pump unit 140E may be a mud pump. The pump unit 140A-F may be communicatively coupled together at the same wellsite by one or more communication methods. The pump units 140A-F may be communicatively couple with a combination of wired and wireless communication methods. For example, a first group of pump units 140A-C may be communicatively coupled with wired communication, e.g., Ethernet. A second group of pump units 140D-E may be communicatively couple to the first group of pump units 140A-C with low powered wireless communication, e.g., WIFI. A third group of pump units 140F may be communicatively coupled to one or more of the first group or second group of pump units by a long range radio communication method, e.g., mobile carrier network.

The computer system 800 may comprise an input-output module 820, e.g., DAQ card, for communication with one or more sensors. The module 820 may be a standalone system with a processor 822, memory, and one or more applications executing in memory. The module 820, as illustrated, may be a card or a device within the computer system 800. In some embodiments, the module 820 may be combined with the input-output device 808. The module 820 may receive one or more analog inputs 824, one or more frequency inputs 826, and one or more Modbus inputs 828. For example, the analog input 824 may include a volume sensor, e.g., a tank level sensor. For example, the frequency input 826 may include a flow meter, i.e., a fluid system flowrate sensor. For example, the Modbus input 828 may include a pressure transducer. The processor 822 may convert the signals received via the analog input 824, the frequency input 826, and the Modbus input 828 into the corresponding sensor data. For example, the processor 822 may convert a frequency input 826 from the flowrate sensor into flow rate data measured in gallons per minute (GPM).

ADDITIONAL DISCLOSURE

The following are non-limiting, specific embodiments in accordance with the present disclosure:

A first embodiment, which is a method of modifying a pumping stage of a pumping operation of a fracturing fleet at a wellsite, comprising receiving, by an optimization process executing on a computer system, an operating setpoint for each of a plurality of pump units; wherein the operating setpoint comprises a flowrate for a subsequent interval of a pumping procedure, wherein the flowrate of the subsequent interval is greater than the flowrate of a current interval, and wherein the pumping procedure comprises a plurality of intervals; initiating, by the optimization process, a set of transfer function models in response to the operating setpoint for a first pumping unit comprising a flowrate value for the subsequent interval that decreases in value or remains the same value; determining, by the optimization process, the transfer function model for each of the pump units; generating, by the optimization process, an interim setpoint for each of the pumping units from the transfer function model, a current flowrate, and the operating setpoint; iterating, by the optimization process, the interim setpoint to a subsequent value in response to the flowrate value from the plurality of the pump units measuring less than a threshold value of the operating setpoint; and ending, by the optimization process, the set of transfer function models in response to the flowrate value from the plurality of the pump units measuring greater than a threshold value of the operating setpoint.

A second embodiment, which is the method of the first embodiment, further comprising assigning, by the optimization process, a first set of transfer function models to the pump units with increasing flowrates, a second set of transfer function models to the pump units with decreasing flowrate, and a third set of transfer function models to the pump units with unchanging flowrates.

A third embodiment, which is the method of the second embodiment, wherein the transfer function models for pump units with increasing flowrates are:

$$G_{up}(s) = \frac{1}{5s+1}$$

for diesel pump units and $$G_{up}(s) = \frac{1}{0.5s+1}$$

for electric pump units.

A fourth embodiment, which is the method of the second embodiment, wherein the transfer function models for pump units with decreasing flowrates are:

$$G_{up}(s) = \frac{1}{5s+1}$$

for diesel pumps and $$G_{up}(s) = \frac{1}{0.5s+1}$$

for electric pumps.

A fifth embodiment, which is the method of the second embodiment, wherein the transfer function models for pumps with unchanging flowrates can be set to zero.

A sixth embodiment, which is the method of the second embodiment, wherein the transfer function model for the pump units with increasing flowrates increases a total flowrate of the plurality of pump units while replacing a flowrate volume of the pump units with decreasing flowrates.

A seventh embodiment, which is the method of the first embodiment, further comprising receiving, by the optimization process, periodic datasets indicative of a pumping operation, and wherein the periodic datasets comprise flowrate measurements from each pump unit.

An eighth embodiment, which is the method of the first embodiment, wherein the interval comprises a volume of fluid of the pumping schedule or a time property of the pumping schedule.

A ninth embodiment, which is the method of the first embodiment, further comprising communicating, by the optimization process, the interim setpoint to each of the pump units; verifying, by the optimization process, each pump unit achieves the flowrate of the interim setpoint from periodic datasets indicative of the pumping operation.

A tenth embodiment, which is the method of the first embodiment, further comprising transporting a wellbore treatment design and a fracturing fleet to a wellsite, wherein the wellbore treatment design comprises wellbore treatment blend, a volume of proppant, a pumping procedure, or combinations thereof; assembling the fracturing fleet at the wellsite, wherein the plurality of pump units are fluidically connected to the wellbore of the treatment well; mixing the wellbore treatment per the pumping procedure; and operating the pump units of the fracturing fleet to place the wellbore treatment into the wellbore per the pumping procedure.

An eleventh embodiment, which is the method of the first embodiment, wherein the fracturing fleet comprises a plurality of pump units, a manifold, a blending unit, a hydration blender, a proppant storage unit, a chemical unit, a water supply unit, or combinations thereof.

A twelfth embodiment, which is a method of controlling a pumping sequence of a fracturing fleet at a wellsite, comprising receiving, by an optimization process executing on a computer system, an operating setpoint for a stage of a pumping procedure; directing, by the optimization process, a pumping operation of a plurality of pump units comprising a set of diesel frac pumps and at least one electric frac pump by transmitting a interim setpoint to each of the pump units; initiating, by the optimization process, a set of transfer function models in response to at least one pump unit with a decreasing flowrate; calculating, by the optimization process, a transfer function model for each of the pump units with increasing flowrates and a transfer function model for each of the pump units with decreasing flowrates; iterating, by the optimization process, a value of the interim setpoint to a subsequent value in response to the flowrate values from the plurality of the pump units reaching the flowrate value of the interim setpoint; and cancelling, by the optimization process, the set of transfer function models in response to the flowrate value from the plurality of the pump units measuring greater than a threshold value of the operating setpoint.

A thirteenth embodiment, which is the method of the twelfth embodiment, wherein the operating setpoint comprises a total flowrate value, a pressure value, a proppant density value, or combinations thereof for a wellbore treatment fluid.

A fourteenth embodiment, which is the method of the twelfth embodiment, wherein the interim setpoint to at least one pump unit is less than a current flowrate, wherein the interim setpoint sent to at least one pump unit of the remaining pump units is greater than the current flowrate, and wherein the plurality of pump units are communicatively connected to the computer system.

An fifteenth embodiment, which is a fracturing fleet system at a wellsite, comprising a blender fluidically connected to a first manifold and a second manifold; a diesel group comprising at least two diesel frac pumps fluidically connected to the first manifold; an electric group comprising at least two electric frac pumps fluidically connected to the second manifold; a wellhead connector fluidly connected to the first manifold and the second manifold; an optimizing process, executing on a computer system, controlling the pumping operation of the fracturing fleet, wherein the optimizing process is communicatively connected to a unit controller within each frac unit of the fracturing fleet, and wherein a plurality of unit controllers are configured to control the frac units; wherein the optimizing process is configured to perform the following: loading an operating setpoint for each of a plurality of pump units, and wherein at least one of the operating setpoints comprises a flowrate value lower than the remaining operating setpoints; communicating an interim setpoint generated by a transfer function model to the plurality of pump units comprising a diesel group and an electric group, wherein at least one of the interim setpoints to the electric group comprises a flowrate with a decreasing flowrate; iterating a current interim setpoint with a transfer function model to a subsequent interim setpoint in response to a current flowrate values from each pump unit exceeding a threshold value of the current interim setpoint; and transitioning to the operating setpoint in response to the current interim flowrate exceeding a threshold value of the operating setpoint.

A sixteenth embodiment, which is the system of the fifteenth embodiment, further comprising a proppant storage unit fluidly connected to the blender.

A seventeenth embodiment, which is the system of the fifteenth embodiment, wherein the fracturing unit comprises a fracturing pump, a manifold, a blending unit, a hydration blender, a proppant storage unit, a chemical unit, or a water supply unit.

An eighteenth embodiment, which is the system of the fifteenth embodiment, wherein the blender is configured to deliver a first treatment fluid to the first manifold and a second treatment fluid to the second manifold.

A nineteenth embodiment, which is the system of the fifteenth embodiment, wherein the wellbore receives a treatment fluid per the operating setpoint for the interval of the pumping procedure comprising a first treatment fluid from the first manifold and a second treatment fluid from the second manifold.

A twentieth embodiment, which is the system of the fifteenth embodiment, wherein the proppant density of the first treatment fluid is the same as the proppant density of the second treatment fluid.

A twenty-first embodiment, which is the system of the eighteenth though the twentieth embodiment, wherein a proppant density of the first treatment fluid is i) the same as or 2) different from a proppant density of the second treatment fluid.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of modifying a pumping stage of a pumping operation of a fracturing fleet at a wellsite, comprising:
receiving, by an optimization process executing on a computer system, an operating setpoint for each of a plurality of pump units; wherein the operating setpoint comprises a flowrate for a subsequent interval of a pumping procedure, wherein the flowrate of the subsequent interval is greater than the flowrate of a current interval, and wherein the pumping procedure comprises a plurality of intervals;
initiating, by the optimization process, a set of transfer function models in response to the operating setpoint for a first pumping unit comprising a flowrate value for the subsequent interval that decreases in value or remains the same value;
determining, by the optimization process, the transfer function model for each of the pump units;
generating, by the optimization process, an interim setpoint for each of the pumping units from the transfer function model, a current flowrate, and the operating setpoint, such that pump units of the plurality of pump units with increasing flowrates compensate for pump units of the plurality of pump units with decreasing flowrates while overall flowrate from the plurality of pump units increases;
iterating, by the optimization process, the interim setpoint to a subsequent value in response to the flowrate value from the plurality of the pump units measuring less than a threshold value of the operating setpoint; and
ending, by the optimization process, the set of transfer function models in response to the flowrate value from the plurality of the pump units measuring greater than a threshold value of the operating setpoint.

2. The method of claim 1, further comprising:
assigning, by the optimization process, a first set of transfer function models to the pump units with increasing flowrates, a second set of transfer function models to the pump units with decreasing flowrates, and a third set of transfer function models to pump units of the plurality of pump units with unchanging flowrates.

3. The method of claim 2, wherein the transfer function models for pump units with increasing flowrates are:

$$G_{up}(s) = \frac{1}{5\,s+1}$$

for diesel pump units and $$G_{up}(s) = \frac{1}{0.5\,s+1}$$

for electric pump units.

4. The method of claim 2, wherein the transfer function models for pump units with decreasing flowrates are:

$$G_{up}(s) = \frac{1}{5\,s+1}$$

for diesel pumps and $$G_{up}(s) = \frac{1}{0.5\,s+1}$$

for electric pumps.

5. The method of claim 2, wherein the transfer function models for pumps with unchanging flowrates can be set to zero.

6. The method of claim 2, wherein the transfer function model for the pump units with increasing flowrates increases a total flowrate of the plurality of pump units while replacing a flowrate volume of the pump units with decreasing flowrates.

7. The method of claim 1, further comprising:
receiving, by the optimization process, periodic datasets indicative of a pumping operation, and wherein the periodic datasets comprise flowrate measurements from each pump unit.

8. The method of claim 1, wherein the interval comprises a volume of fluid of the pumping schedule or a time property of the pumping schedule.

9. The method of claim 1, further comprising:
communicating, by the optimization process, the interim setpoint to each of the pump units;
verifying, by the optimization process, each pump unit achieves the flowrate of the interim setpoint from periodic datasets indicative of the pumping operation.

10. The method of claim 1, further comprising;
transporting a wellbore treatment design and a fracturing fleet to a wellsite, wherein the wellbore treatment design comprises wellbore treatment blend, a volume of proppant, a pumping procedure, or combinations thereof;
assembling the fracturing fleet at the wellsite, wherein the plurality of pump units are fluidically connected to a wellhead connector, wherein the wellhead connector is releasably connected to a wellbore of the treatment well;
mixing the wellbore treatment per the pumping procedure; and
operating the pump units of the fracturing fleet to deliver the wellbore treatment to the wellhead connector per the pumping procedure.

11. The method of claim 1, wherein:
the fracturing fleet comprises a manifold, a blending unit, a hydration blender, a proppant storage unit, a chemical unit, a water supply unit, or combinations thereof.

12. A method of controlling a pumping procedure of a fracturing fleet at a wellsite, comprising:
receiving, by an optimization process executing on a computer system, an operating setpoint for a stage of a pumping procedure;
directing, by the optimization process, a pumping operation of a plurality of pump units comprising diesel frac pumps and electric frac pumps by transmitting an interim setpoint to each of the pump units, wherein the interim setpoint is generated such that the diesel frac pumps with increasing flowrates compensate for the electric frac pumps with decreasing flowrates while overall flowrate from the plurality of pump units increases;
initiating, by the optimization process, a set of transfer function models;
calculating, by the optimization process, a transfer function model for each of the pump units;
iterating, by the optimization process, a value of the interim setpoint to a subsequent value in response to a flowrate value of the plurality of the pump units reaching the value of the interim setpoint; and
cancelling, by the optimization process, the set of transfer function models in response to the flowrate value of the plurality of the pump units measuring greater than a threshold value of the operating setpoint.

13. The method of claim 12, wherein the operating setpoint comprises a total flowrate value, a pressure value, a proppant density value, or combinations thereof for a wellbore treatment fluid.

14. The method of claim 12, wherein:
the interim setpoint to at least one pump unit is less than a current flowrate, wherein the interim setpoint sent to at least one pump unit of the remaining pump units is greater than the current flowrate, and wherein the plurality of pump units are communicatively connected to the computer system.

15. A fracturing fleet system at a wellsite, comprising:
a blender fluidically connected to a first manifold and a second manifold;
a plurality of pump units comprising diesel frac pumps fluidically connected to the first manifold; an electric group comprising at least two manifold and electric frac pumps fluidically connected to the second manifold;
a wellhead connector fluidly connected to the first manifold and the second manifold;
an optimizing process, executing on a computer system, controlling pumping operation of the fracturing fleet system, wherein the optimizing process is communicatively connected to a unit controller within each frac unit of the fracturing fleet, and wherein a plurality of unit controllers are configured to control the frac units;
wherein the optimizing process is configured to perform the following:
loading an operating setpoint for each of a plurality of pump units, and wherein at least one of the operating setpoints comprises a flowrate value lower than the remaining operating setpoints;
communicating an interim setpoint generated by a transfer function model to each of the plurality of pump units such that the diesel frac pumps with increasing flowrates compensate for the electric frac pumps with decreasing flowrates while overall flowrate from the plurality of pump units increases;
iterating a current interim setpoint with a transfer function model to a subsequent interim setpoint in response to a current flowrate values from each pump unit exceeding a threshold value of the current interim setpoint; and
transitioning to the operating setpoint in response to the current interim flowrate exceeding a threshold value of the operating setpoint.

16. The fracturing fleet system of claim 15, further comprising a proppant storage unit fluidly connected to the blender.

17. The fracturing fleet system of claim 15, wherein the frac units comprises a manifold, a blending unit, a hydration blender, a proppant storage unit, a chemical unit, or a water supply unit.

18. The fracturing fleet system of claim 15, wherein:
the blender is configured to deliver a first treatment fluid to the first manifold and a second treatment fluid to the second manifold.

19. The fracturing fleet system of claim 18, wherein;
the wellhead connector receives a treatment fluid per the operating setpoint for an interval of a pumping procedure comprising a first treatment fluid from the first manifold and a second treatment fluid from the second manifold.

20. The fracturing fleet system of claim 18, wherein a proppant density of the first treatment fluid is i) the same as or ii) different from a proppant density of the second treatment fluid.

* * * * *